United States Patent
Fusakawa et al.

(10) Patent No.: US 9,349,372 B2
(45) Date of Patent: May 24, 2016

(54) SPEAKER IDENTIFICATION METHOD, AND SPEAKER IDENTIFICATION SYSTEM

(71) Applicant: Panasonic Intellectual Property Corporation of America, Torrance, CA (US)

(72) Inventors: Kazue Fusakawa, Kanagawa (JP); Tomomi Matsuoka, Osaka (JP); Masako Ikeda, Osaka (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 0 days.

(21) Appl. No.: 14/425,930

(22) PCT Filed: Jul. 8, 2014

(86) PCT No.: PCT/JP2014/003624
§ 371 (c)(1),
(2) Date: Mar. 4, 2015

(87) PCT Pub. No.: WO2015/004909
PCT Pub. Date: Jan. 15, 2015

(65) Prior Publication Data
US 2015/0206537 A1    Jul. 23, 2015

(30) Foreign Application Priority Data

Jul. 10, 2013    (JP) .................................. 2013-144232

(51) Int. Cl.
*G10L 17/26*    (2013.01)
*G10L 17/00*    (2013.01)
(Continued)

(52) U.S. Cl.
CPC .................. *G10L 17/00* (2013.01); *G10L 15/08* (2013.01); *G10L 17/26* (2013.01); *G10L 25/51* (2013.01); *G10L 2015/088* (2013.01)

(58) Field of Classification Search
USPC .................................. 704/231–257, 270, 275
See application file for complete search history.

(56) References Cited

U.S. PATENT DOCUMENTS 5,953,701 A * 9/1999 Neti .................... G10L 15/07
704/240
7,881,933 B2 * 2/2011 Witzman ................ G10L 15/26
704/246

(Continued)

FOREIGN PATENT DOCUMENTS

| JP | 11-282856 | 10/1999 |
| JP | 2005-332404 | 12/2005 |

(Continued)

OTHER PUBLICATIONS

International Search Report issued Oct. 21, 2014 in International (PCT) Application No. PCT/JP2014/003624.

(Continued)

*Primary Examiner* — Abul Azad
(74) *Attorney, Agent, or Firm* — Wenderoth, Lind & Ponack, L.L.P.

(57) ABSTRACT

A speaker identification system (100) includes a microphone (2) which acquires speech information of a speaker; a sex/age range information acquisition unit (7) which acquires age range information relating to a range of the age of the speaker, based on the speech information; a specific age information acquisition unit (8) which acquires specific age information relating to the specific age of the speaker, based on the speech information; a date and time information acquisition unit (9) which acquires date and time information representing the date and time when the speech information has been acquired; and a speaker database (4) which accumulates the specific age information, and the date and time information in association with each other.

19 Claims, 19 Drawing Sheets

(51) Int. Cl.
*G10L 25/51* (2013.01)
*G10L 15/08* (2006.01)

(56) References Cited

U.S. PATENT DOCUMENTS

| | | | |
|---|---|---|---|
| 2006/0080357 A1 | 4/2006 | Sakai et al. | |
| 2011/0206345 A1 | 8/2011 | Masuo | |
| 2012/0059653 A1* | 3/2012 | Adams | G10L 15/19 704/243 |
| 2012/0197629 A1 | 8/2012 | Nakamura et al. | |
| 2012/0253804 A1* | 10/2012 | Sugiura | G10L 15/187 704/235 |
| 2013/0268273 A1* | 10/2013 | Chen | G10L 17/26 704/249 |

FOREIGN PATENT DOCUMENTS

| | | |
|---|---|---|
| JP | 2006-99195 | 4/2006 |
| JP | 2007-304619 | 11/2007 |
| JP | 2011-170282 | 9/2011 |
| WO | 2011/040056 | 4/2011 |

OTHER PUBLICATIONS

Shota Yamamoto et al., "Detection of Baby Voice and its Application to Emotion Recognition", FIT 2009 (The 8th Information Science Technology Forum), lectures and articles 8(2), Aug. 20, 2009, pp. 373-376, with English translation.

* cited by examiner

FIG. 6

| SPEECH INFORMATION | SEX INFORMATION | AGE RANGE INFORMATION | FLAG | SPECIFIC AGE INFORMATION | DATE AND TIME INFORMATION |
|---|---|---|---|---|---|
| 0001.wav | MALE | 51~70 | 0 | — | — |
| 0002.wav | FEMALE | 0~10 | 1 | ZERO YEAR OLD | 2013.05.27 |
| 0003.wav | FEMALE | 20~50 | 0 | — | — |

FIG. 7

| SPECIFIC AGE INFORMATION | SERVICE INFORMATION |
|---|---|
| 3 YEARS OLD | INFORMATION INTRODUCING KINDERGARTENS NEARBY |
| 6 YEARS OLD | BUY SCHOOL BAGS AT XX STORE! (ADVERTISEMENT) |
| ⋮ | ⋮ |

FIG. 11

| USER ID | DATE AND TIME INFORMATION | SOUND PRESSURE LEVEL | SPEECH INFORMATION |
|---|---|---|---|
| 0002 | 2013.05.27 13:45 | 80db | 0002.wav |
| | 2013.05.27 07:30 | 70db | 0012.wav |
| | 2013.05.26 23:10 | 75db | 0033.wav |
| ... | ... | ... | ... |

SPEAKER IDENTIFICATION METHOD, AND SPEAKER IDENTIFICATION SYSTEM

TECHNICAL FIELD

The present invention relates to a speaker identification method and a speaker identification system.

BACKGROUND ART

Heretofore, there has been proposed a method for estimating the viewers of TV programs, and providing appropriate viewing contents to the viewers. Patent Literature 1 discloses a method, in which the ages and sexes of the viewers, and the relationships between the viewers are estimated based on temperature distribution information and speech information, and viewing contents are selected taking into consideration a degree of appropriateness with respect to a viewing place, a viewing time, or the like. According to the method, viewing contents appropriate for the viewers or for the viewing place are provided.

Patent Literature 1, however, requires further research in order to specify the viewers in detail.

CITATION LIST

Patent Literature

Patent Literature 1: Japanese Unexamined Patent Publication No. 2006-99195

SUMMARY OF INVENTION

In view of the above, a speaker identification method according to an aspect of the invention includes a speech acquisition step of acquiring speech information of a speaker; an age information acquisition step of acquiring specific age information relating to a specific age of the speaker, based on the speech information acquired in the speech acquisition step; a date and time information acquisition step of acquiring date and time information representing a date and time when the speech information has been acquired in the speech acquisition step; and an information accumulation step of accumulating the specific age information acquired in the age information acquisition step, and the date and time information acquired in the date and time information acquisition step in association with each other.

According to the invention, it is possible to accurately know the age of the speaker, and to provide services appropriate for the current age of the speaker.

BRIEF DESCRIPTION OF DRAWINGS

FIG. 6 is a diagram illustrating a configuration of speaker information to be managed by a speaker database;

FIG. 7 is a diagram illustrating a configuration of service information to be managed by a service database;

FIG. 11 is a diagram illustrating an example of a database which accumulates cry of babies;

Figure 1:
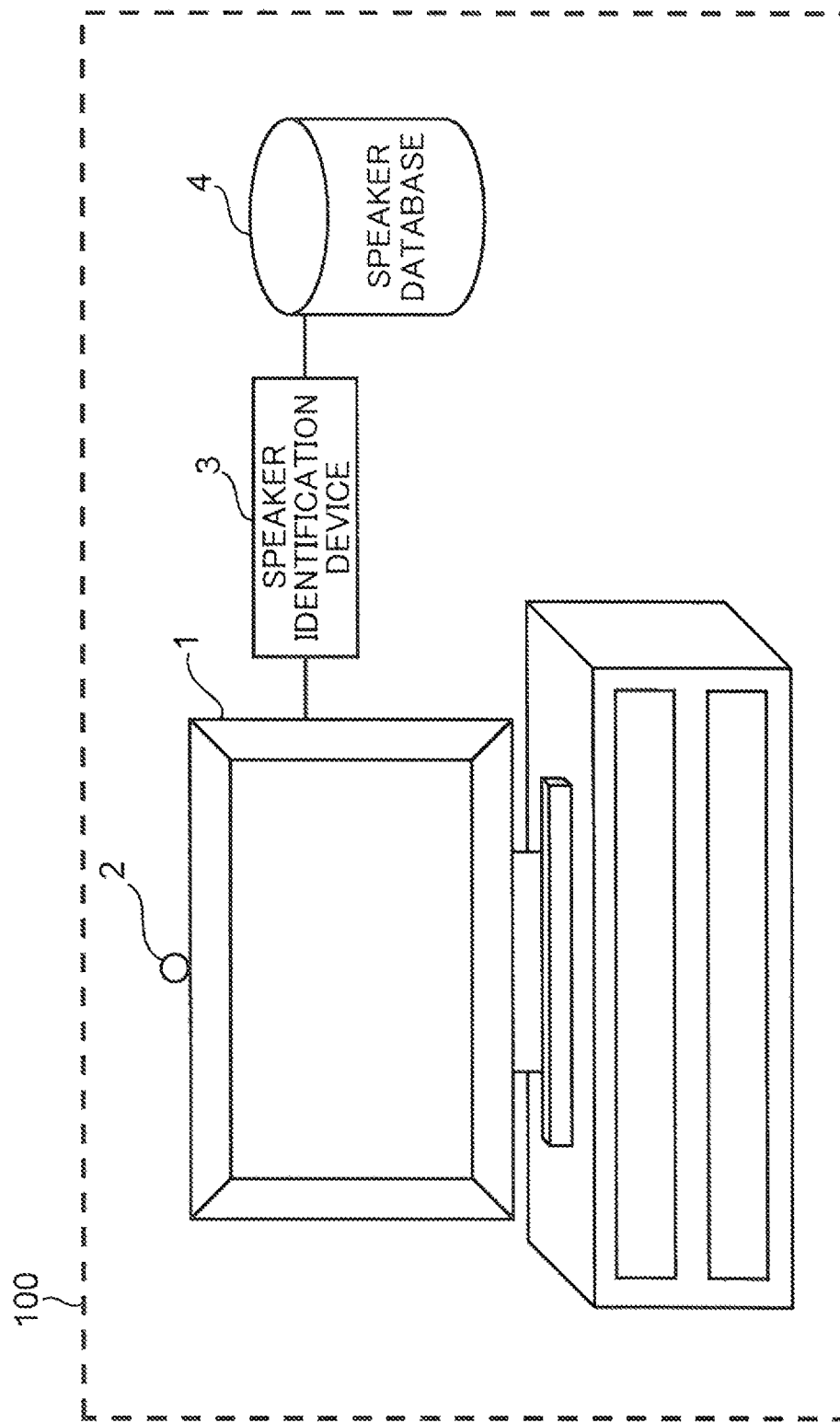
FIG. 1 is a diagram illustrating a schematic configuration of a speaker identification system according to an embodiment of the invention.

DESCRIPTION OF EMBODIMENTS (Findings Based on which the Invention has been Made)

In the process of growth of babies and infants, people experience many events during several years, such as birth, toddling, acquisition of languages, and going to a kindergarten. Providing advertisements and sending commercial messages for each of these events in an appropriate manner enhances the value provided by the advertisements and commercial messages, as compared with the value provided by the ordinary advertisements and commercial messages. Babies are children under 1 year old (namely, zero-year-old babies), and infants are children from 1 year old to under 6 years old.

In the contents providing system described in Patent Literature 1, the ages and sexes of viewers are estimated based on temperature distribution information and speech information.

For instance, in Patent Literature 1, the ages and sexes of viewers are specified by checking the temperature of a site where the viewers are presumed to be present, based on the premise that the body temperature of male adults is lowest, the body temperature of infants is highest, and the body temperature of female adults is between the body temperature of male adults and the body temperature of infants. The above method for estimating the ages, however, is merely classifying the viewers into three groups i.e. male adults, female adults, and infants. Patent Literature 1 fails to disclose a method for specifying the ages of viewers in detail.

Further, Patent Literature 1 discloses a method for estimating the ages and sexes of viewers by analyzing the spectra of speech signals and utterances. However, this method roughly classifies the viewers into male adults, female adults, and infants, as well as the aforementioned method utilizing temperature distribution information.

As described above, in the conventional art, the viewers are roughly classified, and there is no study about a method for specifying the ages and sexes of viewers in detail.

Further, in the conventional art, since there is no study about a method for identifying the ages in detail, there is no study about services to be provided when the ages are specified in detail.

In view of the drawbacks residing in the conventional art, a speaker identification method and a speaker identification system of the invention enable to accurately know the age of the speaker, and to provide services appropriate for the current age of the speaker.

In view of the above, a speaker identification method according to an aspect of the invention includes a speech acquisition step of acquiring speech information of a speaker; an age information acquisition step of acquiring specific age information relating to a specific age of the speaker, based on the speech information acquired in the speech acquisition step; a date and time information acquisition step of acquiring date and time information representing a date and time when the speech information has been acquired in the speech acquisition step; and an information accumulation step of accumulating the specific age information acquired in the age information acquisition step, and the date and time information acquired in the date and time information acquisition step in association with each other.

According to the above configuration, in the speech acquisition step, speech information of the speaker is acquired. In the age information acquisition step, specific age information relating to the specific age of the speaker is acquired, based on the acquired speech information. In the date and time information acquisition step, date and time information representing the date and time when the speech information has been acquired is acquired. In the information acquisition step, the acquired specific age information, and the acquired date and time information are accumulated in association with each other.

Thus, the specific age information relating to the specific age of the speaker is acquired. This makes it possible to know the accurate age of the speaker, and to provide services appropriate for the current age of the speaker.

Further, according to the above aspect, in the age information acquisition step, age range information relating to the range of the age of the speaker may be acquired, based on the speech information acquired in the speech acquisition step; and in the information accumulation step, the speech information acquired in the speech acquisition step, and the age range information acquired in the age information acquisition step may be accumulated in association with each other.

The above configuration makes it possible to manage the speech information and the age range information together with the specific age information.

Further, according to the above aspect, in the age information acquisition step, sex information relating to the sex of the speaker may be acquired, based on the speech information acquired in the speech acquisition step; and in the information accumulation step, the sex information acquired in the age information acquisition step may be accumulated in association with the speech information, the age range information, and the specific age information.

The above configuration makes it possible to manage the sex information relating to the sex of the speaker, together with the speech information, the age range information, and the specific age information.

Further, according to the above aspect, in the specific age information acquisition step, specific age information for specifying the age of a zero-year-old baby may be acquired.

The above configuration makes it easy to specify the age of the speaker, because it is easy to detect cry of a zero-year-old baby.

Further, according to the above aspect, the speaker identification method may further include an information managing step of updating the specific age information accumulated in the information accumulation step in accordance with the number of years elapsed.

The above configuration makes it possible to accurately manage the current age of the speaker, and to provide services appropriate for the current age of the speaker.

Further, according to the above aspect, the speaker identification method may further include an estimation step of estimating a family structure, based on the sex information, the age range information, and the specific age information.

The above configuration makes it possible to provide services appropriate for the family structure.

Further, according to the above aspect, the speaker identification method may further include a service providing step of providing a service to the speaker, based on the sex information, the age range information, and the specific age information accumulated in the information accumulation step.

According to the above configuration, in the service providing step, a service is provided to the speaker, based on the sex information, the age range information, and the specific age information. This makes it possible to provide an optimum service to the speaker.

Further, according to the above aspect, the speaker identification method may further include an information managing step of updating the specific age information accumulated in the information accumulation step in accordance with the number of years elapsed, wherein in the service providing step, advertisement information appropriate for the age to be specified by the specific age information is transmitted, the specific age information being accumulated in the information accumulation step and updated in the information managing step.

According to the above configuration, advertisement information appropriate for the age to be specified by the specific age information is transmitted. This makes it possible to provide advertisement information optimum for the speaker.

Further, according to the above aspect, the speaker identification method may further include a word detection step of analyzing the speech information acquired in the speech acquisition step for converting into character data, and detecting a predetermined pre-registered word from among the converted character data; and a service providing step of providing a service appropriate for the detected predetermined word.

According to the above configuration, acquired speech information is analyzed for converting into character data. A predetermined pre-registered word is detected from among the converted character data. A service appropriate for the detected predetermined word is provided. This makes it possible to provide a service at a timing when a predetermined word is detected.

Further, according to the above aspect, the speaker identification method may further include an utterance detection step of detecting a specific utterance of a specific speaker, based on the speech information acquired in the speech acquisition step; and a service providing step of providing a service appropriate for the specific utterance of the specific speaker.

According to the above configuration, a specific utterance of a specific speaker is detected, based on the acquired speech information. A service appropriate for the specific utterance of the specific speaker is provided. This makes it possible to provide a service at a timing when the specific utterance of the specific speaker is detected.

Further, according to the above aspect, in the utterance detection step, cry of the specific speaker may be detected, based on the speech information acquired in the speech acquisition step; and in the service providing step, a predetermined instrument may be operated, when the cry of the specific speaker is detected for a predetermined time or longer.

According to the above configuration, when cry of a specific speaker is detected, based on the acquired speech information, and the cry of the specific speaker is detected for a predetermined time or longer, a predetermined instrument is operated. This makes it possible to operate the predetermined instrument to help to calm or soothe the crying specific speaker at a timing when the cry of the specific speaker is detected for a predetermined time or longer.

Further, according to the above aspect, in the utterance detection step, cry of the specific speaker may be detected, based on the speech information acquired in the speech acquisition step; and in the service providing step, notice information for notifying that the specific speaker is crying may be transmitted to a predetermined display terminal, when the cry of the specific speaker is detected for a predetermined time or longer.

According to the above configuration, cry of a specific speaker is detected, based on the acquired speech information. When the cry of the specific speaker is detected for a predetermined time or longer, notice information for notifying that the specific speaker is crying is transmitted to a predetermined display terminal. This makes it possible to notify that the specific speaker is crying at a timing when the cry of the specific speaker is detected for a predetermined time or longer.

Further, according to the above aspect, in the utterance detection step, cry of the specific speaker may be detected, based on the speech information acquired in the speech acquisition step; and the speaker identification method may further include a cry information accumulation step of accumulating speech information representing the detected cry, and a point of time when the speech information has been acquired in association with each other.

According to the above configuration, cry of a specific speaker is detected, based on the acquired speech information, and the speech information representing the detected cry, and the point of time when the speech information has been acquired are accumulated in association with each other. This makes it possible to grasp the health condition of the specific speaker, based on the accumulated cry of the specific speaker.

Further, according to the above aspect, the speaker identification method may further include a correction receiving step of displaying the acquired specific age information, and allowing a user to correct the specific age information, when the specific age information is acquired in the specific age information acquisition step.

According to the above configuration, when the specific age information is acquired in the correction receiving step, the acquired specific age information is displayed, and correction of the specific age information is allowed. This makes it possible to accurately acquire the specific age information.

Further, a speaker identification system according to another aspect of the invention includes a speech acquisition unit which acquires speech information of a speaker; an age information acquisition unit which acquires specific age information relating to a specific age of the speaker, based on the speech information acquired by the speech acquisition unit; a date and time information acquisition unit which acquires date and time information representing a date and time when the speech information has been acquired by the speech acquisition unit; and an information accumulation unit which accumulates the speech information acquired by the speech acquisition unit, the sex information acquired by the age information acquisition unit, the age range information acquired by the age information acquisition unit, the specific age information acquired by the age information acquisition unit, and the date and time information acquired by the date and time information acquisition unit in association with each other.

According to the above configuration, the speech acquisition unit acquires the speech information of the speaker. The age information acquisition unit acquires the specific age information relating to the specific age of the speaker, based on the speech information acquired by the speech acquisition unit. The date and time information acquisition unit acquires the date and time information representing the date and time when the speech information has been acquired by the speech acquisition unit. The information accumulation unit accumulates the speech information acquired by the speech acquisition unit, the sex information acquired by the age information acquisition unit, the age range information acquired by the age information acquisition unit, the specific age information acquired by the age information acquisition unit, and the date and time information acquired by the date and time information acquisition unit in association with each other.

Thus, the specific age information relating to the specific age of the speaker is acquired. This makes it possible to know the accurate age of the speaker, and to provide services appropriate for the current age of the speaker.

In this example, for instance, the age of a baby is estimated from baby's cry, and services appropriate for the growth process of the baby is provided, with use of the date and time information representing the date and time when the baby's cry has been acquired.

In the following, embodiments of the invention will be described in detail referring to the drawings. The following embodiments are merely an example of the invention, and do not limit the technical scope of the invention. The numerical values, the shapes, the constituent elements, the steps, and the order of steps described in the following embodiments are examples, and do not limit the gist of the invention. Further, among the constituent elements in the following embodiments, the constituent elements that are not described in independent claims defining the broadest scope are described as optional constituent elements. Further, it is possible to combine each of the contents in all the embodiments.

(First Embodiment)

FIG. 1 is a diagram illustrating a schematic configuration of a speaker identification system according to an embodiment of the invention. A speaker identification system 100 is provided with a television receiver 1, a microphone 2, a speaker identification device 3, and a speaker database 4.

The television receiver 1 displays various images, and receives a radio wave for displaying TV programs. The microphone 2 is mounted on the television receiver 1. The microphone 2 acquires speeches of speakers in a room, such as a mother and a baby. The speaker identification device 3 identifies the speaker based on the speech information acquired by the microphone 2. The speaker database 4 stores information relating to the speaker identified by the speaker identification device 3.

The speaker identification system 100 is classifiable into a television receiver, a microphone, a speaker identification device, and a server, for instance. Each component such as the television receiver and the speaker identification device to be described below is implemented by hardware resources such as a CPU (Central Processing Unit) constituting a computer, an ROM (Read Only Memory) storing a control program, and ICs (Integrated Circuits) for various communications. Further, each component in the server is implemented by hardware resources such as a CPU constituting a computer, an ROM storing a control program, and ICs for various communications.

Figure 2:
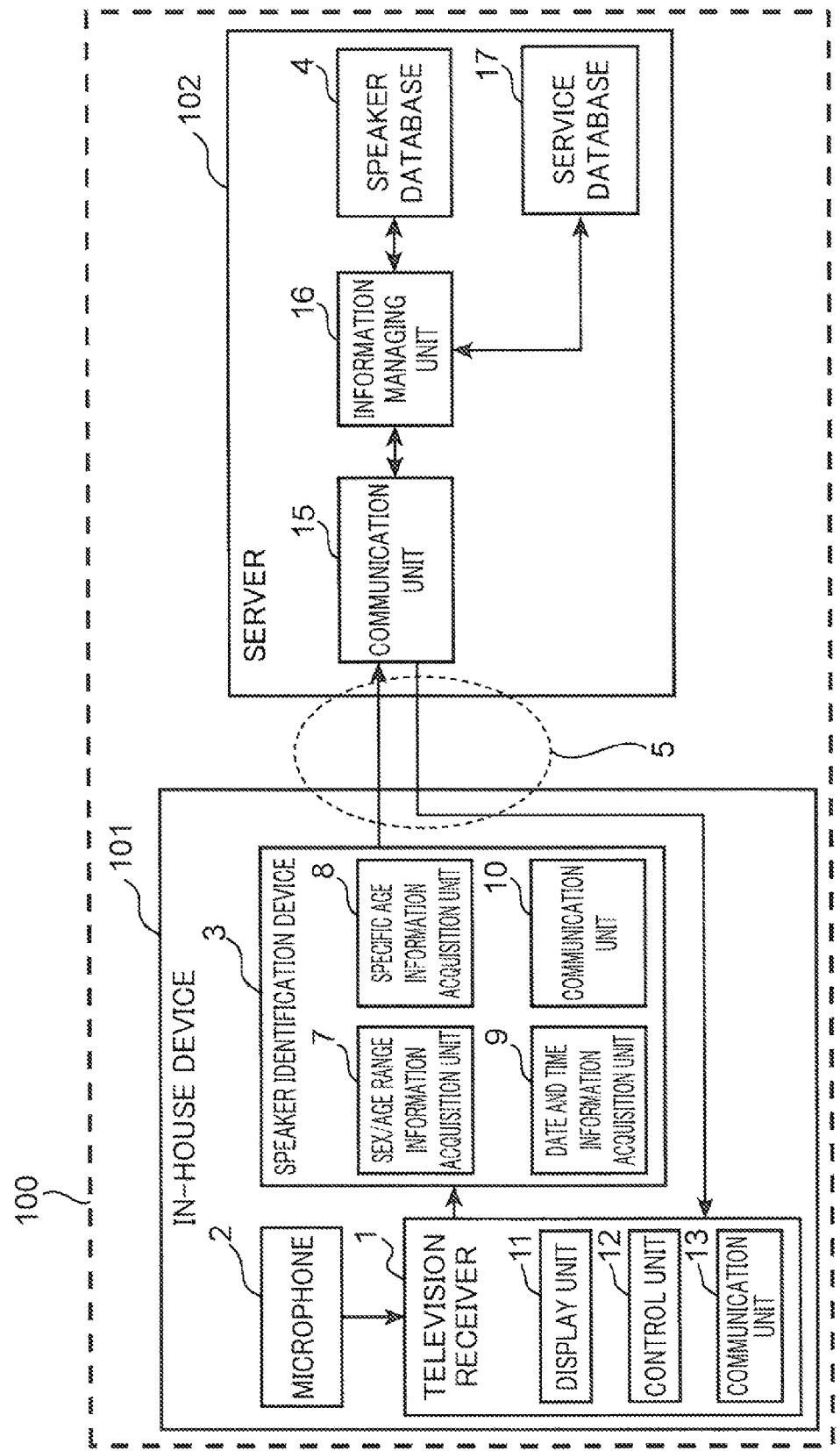
FIG. 2 is a block diagram illustrating a detailed configuration of the speaker identification system according to the first embodiment of the invention.

FIG. 2 is a block diagram illustrating a detailed configuration of the speaker identification system according to the first embodiment of the invention. The speaker identification system 100 illustrated in FIG. 2 is provided with the television receiver 1, the microphone 2, the speaker identification device 3, and a server 102. The television receiver 1, the microphone 2, and the speaker identification device 3 are disposed in a house. An in-house device 101 is constituted of the television receiver 1, the microphone 2, and the speaker identification device 3.

The television receiver 1 is communicatively connected to the server 102 via a network 5. The network 5 is, for instance, the Internet. The television receiver 1 is provided with a display unit 11, a control unit 12, and a communication unit 13. The display unit 11 displays various images, and displays TV programs. The control unit 12 is constituted of a CPU, for instance, and controls the overall operation of the device. The communication unit 13 transmits and receives information to and from the server 102 via the network 5.

The television receiver 1 may be a personal computer, or may be an information terminal device such as a mobile phone or a tablet computer. Further, the television receiver 1 may be a home controller for controlling a variety of household electric appliances installed in a house.

The microphone 2 acquires speech information of the speakers around the microphone 2. The microphone 2 outputs the acquired speech information to the television receiver 1. The control unit 12 of the television receiver 1 outputs the speech information input from the microphone 2 to the speaker identification device 3. In the embodiment, the speech information is output from the microphone 2 to the speaker identification device 3 via the television receiver 1. The invention is not specifically limited to the above. The microphone 2 may output speech information to the speaker identification device 3 without the television receiver 1.

Further, the microphone 2 may have a function of controlling the directivity. According to this configuration, the microphone 2 is directed to a direction in which the speaker is present. This makes it possible to enhance the precision in acquiring speech uttered by the speaker. Further, the microphone 2 may have a function of prohibiting (or eliminating) acquisition of sound other than speech relating to utterance of people. The microphone 2 can enhance the precision in acquiring speech uttered by the speaker by eliminating a speech signal of a television receiver from the acquired speech.

The speaker identification device 3 is communicatively connected to the server 102 via the network 5. The speaker identification device 3 is provided with a sex/age range information acquisition unit 7, a specific age information acquisition unit 8, a date and time information acquisition unit 9, and a communication unit 10.

The sex/age range information acquisition unit 7 acquires sex information relating to the sex of the speaker, and age range information relating to the range of the age of the speaker, based on the speech information acquired by the microphone 2. The sex/age range information acquisition unit 7 estimates the family structure by roughly classifying the speakers into male adults, female adults, and infants, from the spectrum information of speech.

The specific age information acquisition unit 8 acquires specific age information relating to the specific age of the speaker, based on the speech information acquired by the microphone 2. The specific age information acquisition unit 8 specifies the age by detecting cry of a baby, for instance.

The date and time information acquisition unit 9 acquires date and time information representing the date and time when the speech information has been acquired by the microphone 2. The date and time information acquisition unit 9 has a timer function, and specifies the date and time when the speech information has been acquired by the microphone 2.

The communication unit 10 transmits and receives information to and from the server 102 via the network 5. The communication unit 10 transmits, to the server 102, speaker information, in which the speech information acquired by the microphone 2, the sex information acquired by the sex/age range information acquisition unit 7, the age range information acquired by the sex/age range information acquisition unit 7, the specific age information acquired by the specific age information acquisition unit 8, and the date and time information acquired by the date and time information acquisition unit 9 are associated with each other. The speaker information may include a house ID for specifying the house where the television receiver 1 and the speaker identification device 3 are installed.

In the embodiment, the television receiver 1 and the speaker identification device 3 are respectively provided with the communication unit 13 and the communication unit 10. The invention is not specifically limited to the above. The television receiver 1 and the speaker identification device 3 may not be respectively provided with the communication unit 13 and the communication unit 10; and the in-house device 101 may be provided with a communication device communicable with the server 102 within the house. The television receiver 1 and the speaker identification device 3 may transmit and receive information to and from the server 102 via the communication device.

The server 102 is provided with a communication unit 15, an information managing unit 16, a speaker database 4, and a service database 17.

The communication unit 15 transmits and receives information to and from the television receiver 1 and the speaker identification device 3 via the network 5. The communication unit 15 receives the speaker information transmitted by the speaker identification device 3.

The information managing unit 16 stores, in the speaker database 4, the speech information, the sex information, the age range information, the specific age information, and the date and time information included in the speaker information received by the communication unit 15 in association with each other.

The speaker database 4 accumulates therein the speech information acquired by the microphone 2, the sex information acquired by the sex/age range information acquisition unit 7, the age range information acquired by the sex/age range information acquisition unit 7, the specific age information acquired by the specific age information acquisition unit 8, and the date and time information acquired by the date and time information acquisition unit 9 in association with each other. The speaker database 4 manages the family structure.

The service database 17 stores therein service information relating to the services to be provided to the speaker. For instance, the service database 17 accumulates ages, and advertisement images to be provided appropriate for the ages in association with each other.

The information managing unit 16 selects service information to be provided to the speaker, based on the sex information, the age range information, and the specific age information accumulated in the speaker database 4. The information managing unit 16 selects advertisement information appropriate for the age to be specified by the specific age information accumulated in the speaker database 4. Various service information selected with use of the family structure to be managed by the speaker database 4 is transmitted to the television receiver 1 via the network 5, and is displayed on the television receiver 1.

The communication unit 15 transmits the service information selected by the information managing unit 16 to the television receiver 1. The communication unit 13 of the television receiver 1 receives the service information transmitted by the server 102. The control unit 12 displays the received service information on the display unit 11.

Further, the information managing unit 16 has a timer function, and updates the specific age information accumulated in the speaker database 4 in accordance with the number of years elapsed. For instance, when one year has passed from the date and time represented by the date and time information accumulated in the speaker database 4, the information managing unit 16 increments the age represented by the specific age information by 1 year. This configuration makes it possible to automatically update the age of the registered speaker so that the services appropriate for the current age of the speaker can be provided.

Further, the information managing unit 16 may estimate the family structure based on the sex information, the age range information, and the specific age information. For instance, when the sex information represents a male, the age range information represents the age ranging from 20 years old to 40 years old, and the specific age information, as other speech information, represents the age of zero, the information managing unit 16 may further add the information that the speaker is the baby's father. Further, for instance, when the sex information represents a female, the age range information represents the age ranging from 20 years old to 40 years old, and the specific age information, as other speech information, represents the age of zero, the information managing unit 16 may further add the information that the speaker is the baby's mother. Furthermore, for instance, when the sex information represents a female, and the specific age information represents the age of zero, the information managing unit 16 may further add the information that the speaker is a child.

In the embodiment, the speaker identification system 100 corresponds to an example of a speaker identification system, the microphone 2 corresponds to an example of a speech acquisition unit, the sex/age range information acquisition unit 7 and the specific age information acquisition unit 8 correspond to an example of an age information acquisition unit, the date and time information acquisition unit 9 corresponds to an example of a date and time information acquisition unit, and the speaker database 4 corresponds to an example of an information accumulation unit.

In the embodiment, in addition to the classification into male adults, female adults, and infants, the age of a baby is specified, a database is configured, and services in accordance with the number of years/months elapsed are provided with use of the date and time information. According to this configuration, it is possible to provide various services at an appropriate timing during the growing process of a child, particularly from a baby.

Figure 3:
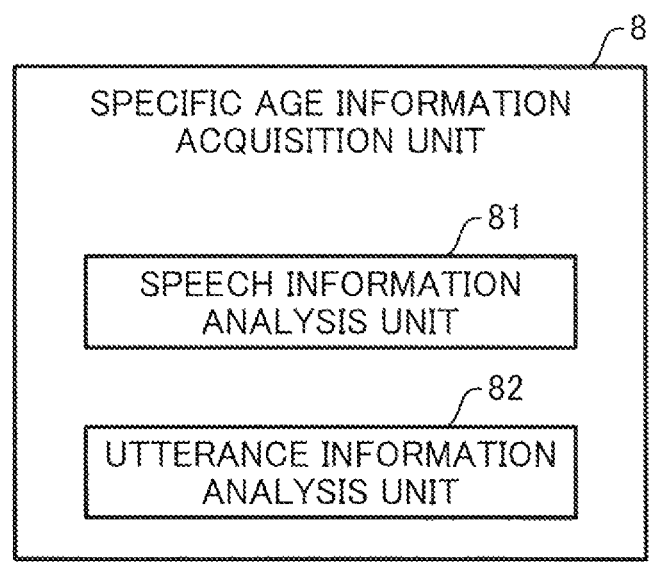
FIG. 3 is a diagram illustrating a detailed configuration of a specific age information acquisition unit illustrated in FIG. 2.

The specific age information acquisition unit 8 illustrated in FIG. 2 is described in detail. FIG. 3 is a diagram illustrating a detailed configuration of the specific age information acquisition unit 8 illustrated in FIG. 2. As illustrated in FIG. 3, the specific age information acquisition unit 8 includes a speech information analysis unit 81 and an utterance information analysis unit 82.

The specific age information acquisition unit 8 judges whether the acquired speech information coincides with the information relating to a specific age. Specifically, the specific age information acquisition unit 8 judges whether the acquired speech information coincides with a specific age by analyzing one or more of the information relating to an average frequency and a sound pressure level among the acquired speech information, and the information relating to an uttered word in combination.

In the embodiment, an example, in which the age of a baby under 1 year old is specified, is described. For instance, generally, utterance contents or speech information (such as a frequency band) of a baby is unique, as compared with the other age groups. In particular, it is known that a baby who cannot speak has a unique vocal feature that the pitch change is sharp (see "Detection of Baby Voice and its Application to Emotion Recognition" by Shota YAMAMOTO and other three persons, Forum on Information Technology, lectures and articles 8(2), Aug. 20, 2009, pp. 373-376). The specific age information acquisition unit 8 defines in advance a measurement time interval and a threshold value of a change in fundamental frequency, measures the fundamental frequency using auto-correlation, and judges whether the measured fundamental frequency changes by the threshold value or more. When it is judged that the measured fundamental frequency changes by the threshold value or more, the specific age information acquisition unit 8 specifies that the age of the speaker is zero.

Further, speech data representing the cry of multitudes of babies may be acquired, and an acoustic model may be created in advance based on the acquired large amount of speech data. The specific age information acquisition unit 8 may specify the age of the speaker by comparing the acquired speech information, and the acoustic model of babies' cry that has been created in advance.

The speech information analysis unit 81 acquires the specific age such as zero by analyzing the speech of a baby from the acquired speech information, with use of these features and information.

In the method for specifying the age, it is possible to enhance the precision by combining other information, in addition to simply analyzing the speech information as described above. For instance, speech and utterance contents of babies rapidly change in a short period of time such as one year. The number of words uttered by babies rapidly increases, and the speech bandwidth rapidly increases. In view of the above, the speech information analysis unit 81 may analyze a change in the speech bandwidth, and the utterance information analysis unit 82 may analyze whether the age of the speaker coincides with the specific age by analyzing the change in the number of uttered words.

Further, as long as speech information is continuously acquired, it is possible to detect that speech of a new family member is added. When speech of a new family member is added, and the speech of the new family member is speech of a baby, the specific age information acquisition unit 8 judges that the age of the new family member associated with the newly added speech information is zero.

In the embodiment, the method for acquiring a specific age utilizes utterance or speech of a baby. The invention is not specifically limited to the above. Further, in the foregoing, a method for specifying the age has been described, when the specific age is zero. It is possible to set the age other than zero, as the specific age. For instance, when the word uttered by the speaker is recognized from the speech information, and the recognized word coincides with a specific word that is registered in advance in association with the specific age, the specific age information acquisition unit 8 may determine the specific age associated with the specific word.

For instance, the utterance information analysis unit 82 may determine that the specific age is 6 years old, when the age ranging "from 0 year old to teenager" is acquired by the sex/age range information acquisition unit 7, and when the words "elementary school" and "entrance ceremony" are detected with a predetermined frequency or more.

Further, the specific age to be set is not limited to one. A plurality of specific ages may be set for each of the age range information classified by the sex/age range information acquisition unit 7. In this case, it is possible to set the age which is likely to be estimated from the word acquired by the utterance information analysis unit 82, as the specific age.

Next, an operation to be performed by the speaker identification system 100 according to the first embodiment of the invention is described.

Figure 4:
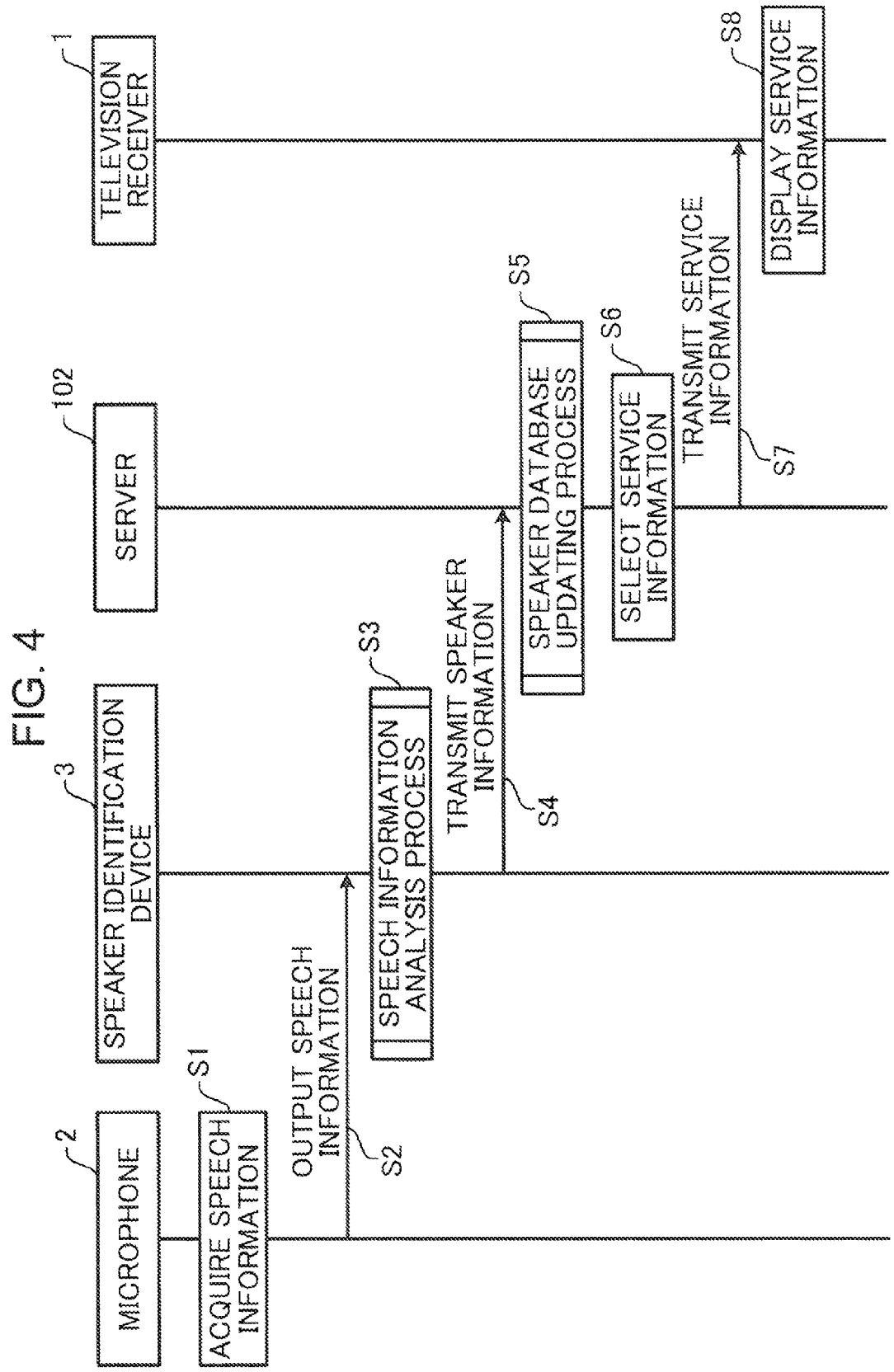
FIG. 4 is a sequence diagram illustrating a flow of a process to be performed by the speaker identification system according to the first embodiment of the invention.

FIG. 4 is a sequence diagram illustrating a flow of a process to be performed by the speaker identification system according to the first embodiment of the invention.

First of all, in Step S1, the microphone 2 acquires speech information of the speaker. For instance, the microphone 2 is mounted on the television receiver installed in a room where the family gets together, and acquires speech of people who are present in the vicinity of the microphone 2.

Subsequently, in Step S2, the microphone 2 outputs the acquired speech information to the speaker identification device 3.

Subsequently, in Step S3, the speaker identification device 3 performs a speech information analysis process of analyzing the speech information acquired by the microphone 2. The speaker identification device 3 creates speaker information by the speech information analysis process. The speech information analysis process will be described later using FIG. 9.

Subsequently, in Step S4, the speaker identification device 3 transmits the speaker information created by the speech information analysis process to the server 102. The communication unit 15 of the server 102 receives the speaker information transmitted from the speaker identification device 3.

Figure 5:
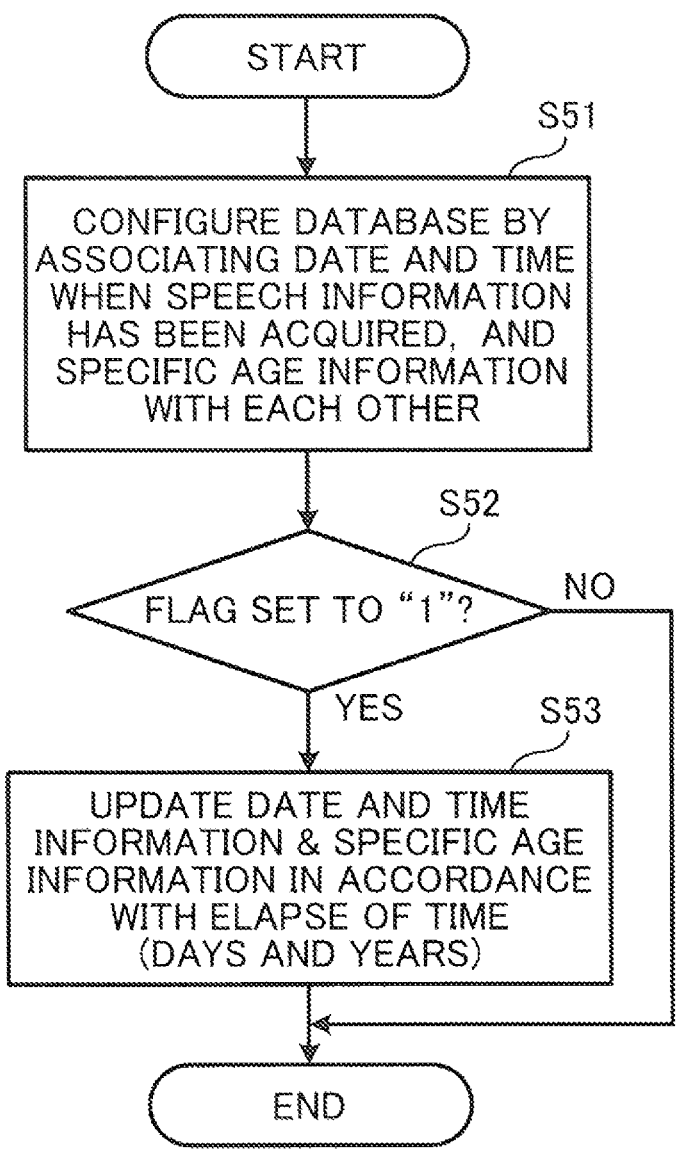
FIG. 5 is a flowchart for describing a speaker database updating process in Step S5 illustrated in FIG. 4.

Subsequently in Step S5, the information managing unit 16 of the server 102 updates the speaker database 4 based on the received speaker information. Specifically, the information managing unit 16 stores the received speaker information in the speaker database 4. As illustrated in FIG. 5, in Step S5, the information managing unit 16 manages and updates the acquired database in accordance with an elapse of time.

FIG. 5 is a flowchart for describing a speaker database updating process in Step S5 illustrated in FIG. 4.

First of all, in Step S51, the information managing unit 16 configures a speaker database by associating the date and time when the speech information has been acquired, and the specific age information with each other.

FIG. 6 is a diagram illustrating a configuration of speaker information to be managed by the speaker database. As illustrated in FIG. 6, the speaker database 4 is constituted of speech information, sex information, age range information, a flag, specific age information, and date and time information. The speaker database 4 stores therein the speech information, the sex information, the age range information, the flag, the specific age information, and the date and time information in association with each other.

The speech information is information in terms of spectra or frequencies of speech signals, and is stored as WAV format files. The speech information may not be necessarily stored as WAV format files. The speech information may be data which has been subjected to speech compression in e.g. an MPEG format or an AIFF format. Further, the speech information is automatically encoded in a compressed file, for instance, and is stored in the speaker database 4.

The sex information represents the sex of the speaker, and is information representing a male or a female. The age range information represents an approximate age of the speaker, and is represented by a predetermined range such as from 0 year old to 10 years old, from 20 years old to 40 years old, and from 50 years old to 70 years old. The specific age information represents the specific age of the speaker, for instance, 0 year old or 1 year old. The flag represents whether the speech information is associated with specific age information. When the speech information is not associated with specific age information, the flag is set to "0", and when the speech information is associated with specific age information, the flag is set to "1". When a database is configured for the first time, the date and time when the speech information has been acquired is retained as date and time information. The date and time information is represented by year/month/day, such as "2013/05/27".

Referring back to FIG. 5, subsequently, in Step S52, the information managing unit 16 judges whether the flag is set to "1". When it is judged that the flag is set to "1" (YES in Step S52), the speaker database updating process proceeds to the process of Step S53. When it is judged that the flag is not to set to "1", in other words, when the flag is set to "0" (NO in Step S52), the speaker database updating process is ended.

Subsequently, in Step S53, the information managing unit 16 updates the date and time information and the specific age information in accordance with an elapse of time (an elapse of days and an elapse of years) from the date and time when the speech information has been acquired. Referring to FIG. 6, for instance, when the date and time information at the point of time when the speech information "0002.wav" has been acquired is "2013/05/27", the specific age information is updated to "1 year old" on May 27, 2014 after an elapse of 1 year from May 27, 2013.

The database to be configured in the speaker database 4 is not limited to the above example. As far as the specific age information in which the flag is set to "1", and the date and time information are accumulated, other information may not be accumulated (managed) as a database. For instance, speech information may be omitted from the information to be managed by the speaker database 4. In this case, it is desirable to manage the data relating to speech information in another database (a speech database for speaker identification and for speech identification) in association with the ID for specifying the speaker.

Referring back to FIG. 4, subsequently, in Step S6, the information managing unit 16 selects service information to be provided to the speaker from the service database 17, based on the sex information, the age range information, and the specific age information accumulated in the speaker database 4. When the service information is selected, the information managing unit 16 may judge whether the specific age information is stored based on the presence or absence of a flag. According to this configuration, when the flag representing that the specific age information is stored is set, service information to be provided to the speaker is selected from the service database 17. The information managing unit 16 selects a service appropriate for the age represented by the specific age information, when there is a service appropriate for the age represented by the specific age information updated in Step S53 illustrated in FIG. 5.

FIG. 7 is a diagram illustrating a configuration of service information to be managed by the service database 17. As illustrated in FIG. 7, the service database 17 is constituted of specific age information and service information. The service database 17 stores the specific age information and the service information in association with each other.

The specific age information represents the specific age of the speaker to which a service is provided, for instance, 3 years old or 6 years old. The service information represents services to be provided appropriate for the associated specific age information. For instance, the specific age information representing 3 years old is associated with service information introducing kindergartens nearby. The specific age information representing 6 years old is associated with service information representing advertisements of sales stores selling school bags. In the example illustrated in FIG. 6, the specific age information is updated to 3 years old on May 27, 2016 three years after the date and time information "2013/05/27" representing the point of time when the speech information "0002.wav" has been acquired. The information managing unit 16 selects the service (information introducing kindergartens nearby) associated with the age represented by the specific age information at the point of time when the specific age information is updated.

Further, the service database 17 may manage the service information in association with the sex information and the age range information. For instance, males of forties may be associated with service information representing advertisements of cars, and females of thirties may be associated with service information representing advertisements of cosmetics. An advertisement optimum for the age and the sex of the user is selected as service information.

Subsequently, in Step S7, the communication unit 15 transmits the service information selected by the information managing unit 16 to the television receiver 1. The communication unit 13 of the television receiver 1 receives the service information transmitted by the server 102.

Subsequently, in Step S8, the control unit 12 of the television receiver 1 displays the received service information on the display unit 11.

Figure 8A:
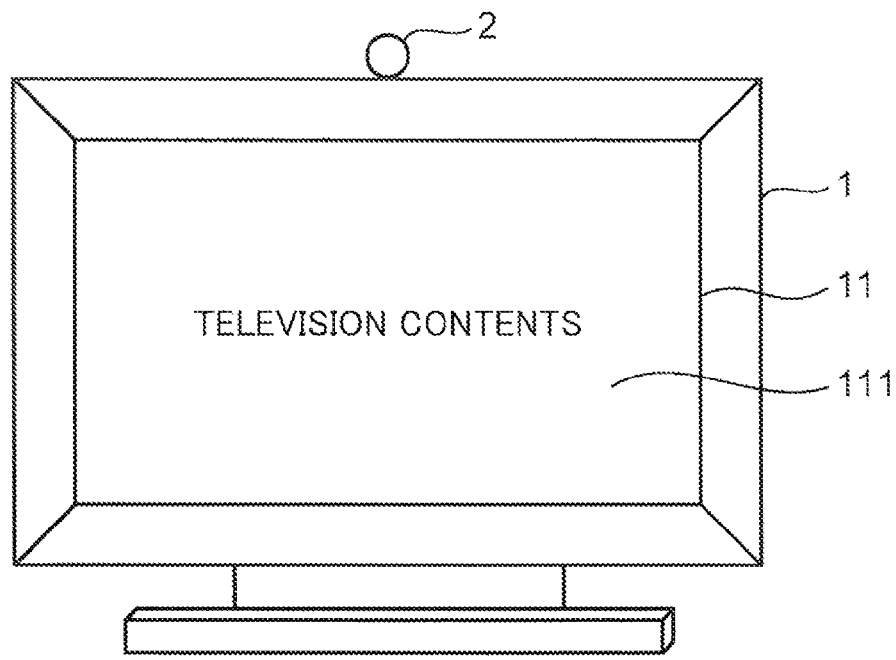
FIG. 8A is a diagram illustrating an example of an ordinary display screen to be displayed on a display unit of a television receiver.
Figure 8B:
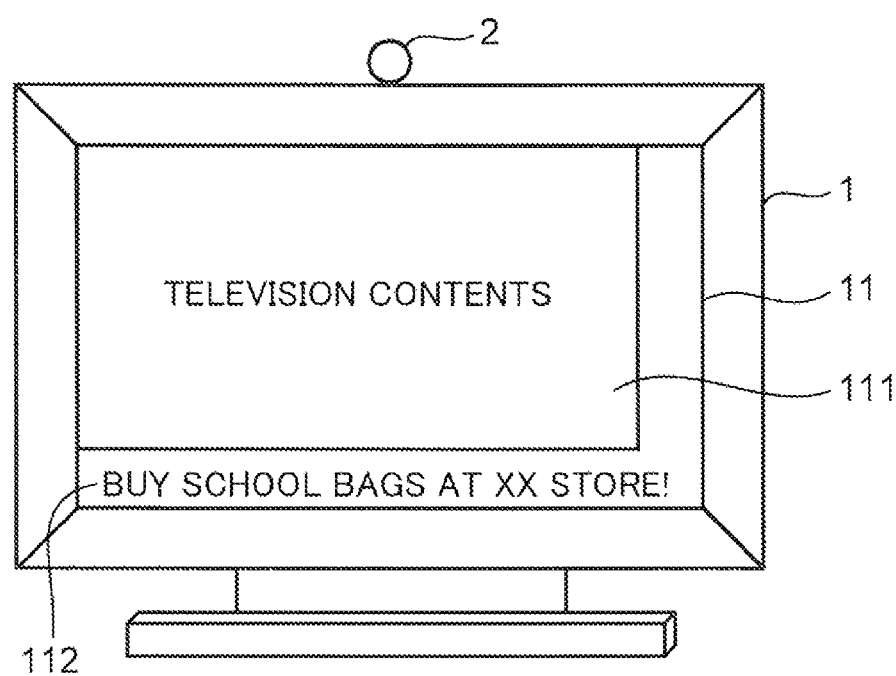
FIG. 8B is a diagram illustrating an example of a display screen including service information to be displayed on the display unit of the television receiver.

FIG. 8A is a diagram illustrating an example of an ordinary display screen to be displayed on the display unit of the television receiver. FIG. 8B is a diagram illustrating an example of a display screen including service information to be displayed on the display unit of the television receiver.

As illustrated in FIG. 8A, usually, the display unit 11 of the television receiver 1 displays television contents 111, for instance. As illustrated in FIG. 8B, when service information is received from the server 102, the display unit 11 of the television receiver 1 displays service information 112 together with the television contents 111. When the service information 112 is displayed, the display unit 11 of the television receiver 1 displays the service information 112 on a part of the screen, for instance, on the periphery, the upper part, or the lower part of the screen.

When it is recognized that the user of the specific age information associated with the service information is present in the vicinity of the television receiver 1, the display unit 11 displays the service information. Recognition as to whether the user is present in the vicinity of the television receiver 1 is performed by analyzing the speech information.

Further, the display unit 11 may display the service information, when it is recognized that a user corresponding to the parent of a user represented by the specific age information associated with the service information is in the vicinity of the television receiver 1.

Further, the display unit 11 may display the service information at an optimum timing in accordance with the contents of the service information. In this case, the service database 17 stores in advance date and time information representing the point of time when the service information is displayed in association with the service information. When the date and time information is received together with the service information to be displayed, the display unit 11 displays the service information in accordance with the date and time information.

Further, the display unit 11 may display the service information at a timing when the microphone 2 acquires again the speech of the speaker that coincides with the speech information associated with the information (e.g. specific age information) used in selecting the service information in Step S6. According to this configuration, it is possible to display the service information at a timing when the user to whom the service information is presented is present in front of the television receiver. This makes it possible to enhance the effect of service information presentation.

Further, the display unit 11 may display the service information, when not the television contents but a CM (a commercial message) is displayed on the display screen.

Furthermore, the display unit 11 may display the service information, when the television receiver 1 is operated by a remote controller.

Next, the speech information analysis process in Step S3 illustrated in FIG. 4 is described in detail.

Figure 9:
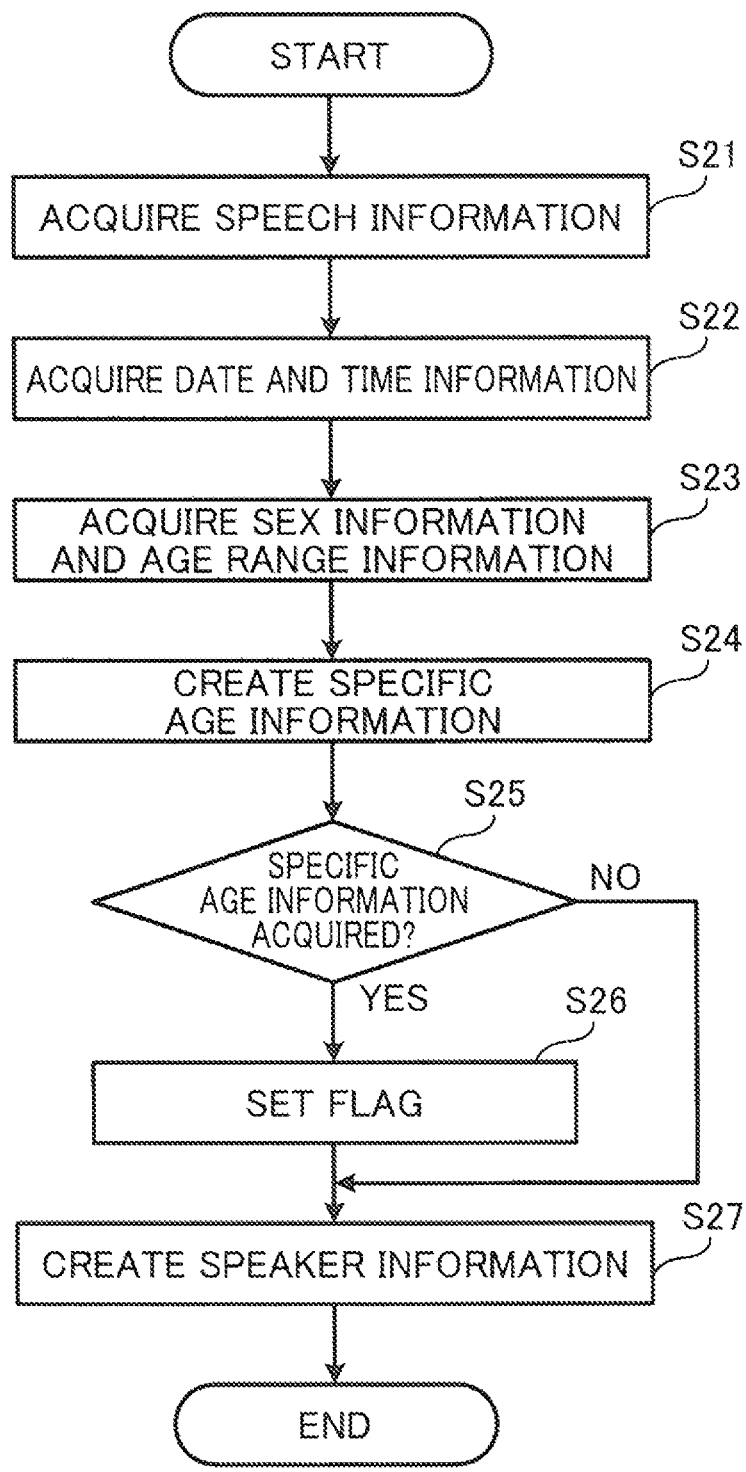
FIG. 9 is a flowchart for describing a speech information analysis process in Step S3 illustrated in FIG. 4.

FIG. 9 is a flowchart for describing the speech information analysis process in Step S3 illustrated in FIG. 4.

First of all, in Step S21, the speaker identification device 3 acquires speech information output by the microphone 2.

Subsequently, in Step S22, the date and time information acquisition unit 9 acquires the date and time information representing the date and time when the speech information has been acquired by the microphone 2. The date and time information acquisition unit 9 specifies the current date and time, as the date and time when the speech information has been acquired by the microphone 2.

Subsequently, in Step S23, the sex/age range information acquisition unit 7 acquires sex information relating to the sex of the speaker, and age range information relating to the range of the age of the speaker, based on the speech information acquired by the microphone 2.

Generally, it is known that the fundamental frequency of speech information differs depending on a difference in age and a difference in sex. For instance, it is said that the fundamental frequency of speech information of males is in the range of from 150 Hz to 550 Hz, and the fundamental frequency of speech information of females is in the range of from 400 Hz to 700 Hz. In view of the above, for instance, when the average fundamental frequency of the acquired speech information is 500 Hz or lower, the sex/age range information acquisition unit 7 judges that the speaker is a male; and when the average fundamental frequency of the acquired speech information is higher than 500 Hz, the sex/age range information acquisition unit 7 judges that the speaker is a female. In this way, when the average fundamental frequency of the acquired speech information is equal to or smaller than a predetermined value, the sex/age range information acquisition unit 7 judges that the speaker is a male; and when the average fundamental frequency of the acquired speech information is larger than the predetermined value, the sex/age range information acquisition unit 7 judges that the speaker is a female.

Further, the sex/age range information acquisition unit 7 specifies the approximate age of the speaker in accordance with the value of the average fundamental frequency of the acquired speech information. For instance, when the value of the average fundamental frequency of the acquired speech information is in a first range, the sex/age range information acquisition unit 7 judges that the age of the speaker is from 0 year old to 10 years old; when the value of the average fundamental frequency of the acquired speech information is in a second range different from the first range, the sex/age range information acquisition unit 7 judges that the speaker is from 11 years old to 19 years old; when the value of the average fundamental frequency of the acquired speech information is in a third range different from the first and second ranges, the sex/age range information acquisition unit 7 judges that the speaker is from 20 years old to 50 years old; when the value of the average fundamental frequency of the acquired speech information is in a fourth range different from the first to third ranges, the sex/age range information acquisition unit 7 judges that the speaker is from 51 years old to 70 years old; and when the value of the average fundamental frequency of the acquired speech information is in a fifth range different from the first to fourth ranges, the sex/age range information acquisition unit 7 judges that the speaker is 71 years old or older.

Subsequently, in Step S24, the specific age information acquisition unit 8 creates specific age information relating to the specific age of the speaker, based on the speech information acquired by the microphone 2. When the specific age is set to zero, for instance, the specific age information acquisition unit 8 judges whether the fundamental frequency of the acquired speech information changes by a threshold value or more. When it is judged that the fundamental frequency changes by the threshold value or more, the specific age information acquisition unit 8 determines that the specific age of the speaker is zero; and when it is judged that the fundamental frequency does not change by the threshold value or more, the specific age information acquisition unit 8 does not determine the specific age of the speaker. The specific age information acquisition unit 8 creates specific age information representing the determined specific age.

For instance, when it is judged that the value of the average fundamental frequency of the speech information acquired by the sex/age range information acquisition unit 7 in Step S23 is in the range other than the first range in a state that the specific age is set to zero, the process of Step S24 may be omitted.

Subsequently, in Step S25, the specific age information acquisition unit 8 judges whether the specific age information has been acquired. When it is judged that the specific age information has not been acquired (NO in Step S25), the speech information analysis process proceeds to the process of Step S27.

On the other hand, when it is judged that the specific age information has been acquired (YES in Step S25), in Step S26, the specific age information acquisition unit 8 sets a flag indicating that the specific age information has been acquired.

Subsequently, in Step S27, the communication unit 10 creates speaker information, in which the sex information acquired by the sex/age range information acquisition unit 7, the age range information acquired by the sex/age range information acquisition unit 7, the specific age information acquired by the specific age information acquisition unit 8, the flag set by the specific age information acquisition unit 8, and the date and time information acquired by the date and time information acquisition unit 9 are associated with each other.

Preferably, the speech information analysis process may be performed at a predetermined time interval, so that the latest speaker information is stored in the speaker database 4. When the speech information analysis process is performed, the information managing unit 16 compares the speech information included in the newly acquired speaker information, and the speech information stored in the speaker database 4, and updates the speaker information whose speech information coincides with the speech information stored in the speaker database 4, as the latest speaker information. Further preferably, the speech information analysis process may be performed at a short time interval such as every day, every three days, or every week. For instance, when the speech information analysis process is performed every year, the acquired speech information may be judged to be different from the speech information stored in the speaker database 4. In view of the above, updating the speaker information at a relatively short time interval makes it possible to accurately store the speaker information in the speaker database 4.

Further, when the speaker information in the speaker database 4 is updated, the date and time information may be the date and time when the latest speech information has been acquired, but may be the date and time when the speech information has been acquired for the first time.

Further, when the speaker information stored in the speaker database 4 is not updated for a predetermined period of time, the information managing unit 16 may delete the speaker information. According to this configuration, it is possible to handle a change in the family structure, and to prevent storing speaker information of a person other than the family members in the speaker database 4.

In this way, in the embodiment, when the age to be specified by the specific age information that has been accumulated and updated reaches a predetermined age, the information managing unit 16 of the server 102 provides a service appropriate for the age to be specified by the specific age information. The service is, for instance, distributing advertisement information appropriate for the specific age. Specifically, when the age to be specified by the specific age information that has been accumulated and updated reaches a predetermined age, the information managing unit 16 selects the advertisement information appropriate for the age to be specified by the specific age information, and transmits the selected advertisement information to the television receiver 1.

Further, when a predetermined pre-registered word is detected from among the speech information uttered by the user, the information managing unit 16 may provide a service appropriate for the age to be specified by the predetermined word. The service in this case is distributing advertisement information appropriate for the specific age.

The speaker identification device 3 may be further provided with a word detection unit which analyzes the speech information acquired by the microphone 2 for converting into character data, and detects a predetermined pre-registered word from among the converted character data. The predetermined word is sored in advance in a memory provided in the speaker identification device 3. When a predetermined pre-registered word is detected from among the converted character data, the word detection unit outputs the detected word to the communication unit 10. The communication unit 10 creates speaker information, in which the sex information acquired by the sex/age range information acquisition unit 7, the age range information acquired by the sex/age range information acquisition unit 7, the specific age information acquired by the specific age information acquisition unit 8, the flag set by the specific age information acquisition unit 8, the date and time information acquired by the date and time information acquisition unit 9, and the predetermined word detected by the word detection unit are associated with each other; and transmits the created speaker information to the server 102. The information managing unit 16 of the server 102 provides a service appropriate for the predetermined word included in the received speaker information. The service is, for instance, distributing advertisement information appropriate for the fpredetermined word. The service database 17 stores a plurality of words and service information (advertisement information) appropriate for each of the words in association with each other.

For instance, when a pre-registered word "entrance ceremony" is detected, advertisement information appropriate for "entrance ceremony" is transmitted to the television receiver 1.

In this way, the speech information acquired by the microphone 2 may be analyzed for converting into character data, a predetermined pre-registered word may be detected from among the converted character data, and advertisement information appropriate for the detected predetermined word may be distributed.

Further, when a specific utterance of a specific speaker is detected, the information managing unit 16 may provide a service appropriate for the specific utterance of the specific speaker.

As described above, the specific age information acquisition unit 8 is capable of detecting cry of infants by setting in advance a measurement time interval and a threshold value of a change in the fundamental frequency, measuring the fundamental frequency using auto-correlation, and judging whether the measured fundamental frequency changes by the threshold value or more. When the measured fundamental frequency changes by the threshold value or more, the specific age information acquisition unit 8 judges that the speaker is a zero-year-old baby, and judges that the utterance is baby's cry. The communication unit 10 creates speaker information, in which the sex information acquired by the sex/age range information acquisition unit 7, the age range information acquired by the sex/age range information acquisition unit 7, the specific age information acquired by the specific age information acquisition unit 8, the flag set by the specific age information acquisition unit 8, the date and time information acquired by the date and time information acquisition unit 9, and the information representing that baby's cry is detected by the specific age information acquisition unit 8 are associated with each other; and transmits the created speaker information to the server 102. The information managing unit 16 of the server 102 provides a service appropriate for baby's cry, when the received speaker information includes the information representing that baby's cry is detected.

Alternatively, a service may be provided not in a case that baby's cry is simply detected, but in a case that baby's cry is detected for a predetermined time or longer. For instance, when baby's cry is detected for a predetermined time or longer, the information managing unit 16 may select information for supporting child care, and the communication unit 15 may transmit the information for supporting child care to the television receiver 1. The communication unit 13 of the television receiver 1 receives the information for supporting child care from the server 102, and the display unit 11 displays the received information for supporting child care.

Further, for instance, when baby's cry is detected for a predetermined time or longer, the information managing unit 16 may select a video that helps to calm or soothe the crying baby, and the communication unit 15 may transmit, to the television receiver 1, the video that helps to calm or soothe the crying baby. The communication unit 13 of the television receiver 1 receives the video that helps to calm or soothe the crying baby from the server 102, and the display unit 11 displays the received video that helps to calm or soothe the baby.

Further, for instance, when baby's cry is detected for a predetermined time or longer, the information managing unit 16 may select an instruction for displaying the website of an SNS (Social Networking Service) which is registered in advance by the parent of the baby, and the communication unit 15 may transmit the instruction for displaying the website of the SNS to the television receiver 1. The communication unit 13 of the television receiver 1 receives the instruction for displaying the website of the SNS from the server 102, and the display unit 11 displays the website of the SNS.

Further, when baby's cry is detected for a predetermined time or longer, a predetermined instrument may be operated. For instance, when baby's cry is detected for a predetermined time or longer, the information managing unit 16 may select an instruction for operating an air conditioner or a fan, and the communication unit 15 may transmit the instruction for operating the air conditioner or the fan to the air conditioner or the fan installed in the house where baby's cry is detected. The air conditioner or the fan receives the instruction for operating the air conditioner or the fan from the server 102, and is operated in response to the received instruction. The instruction for operating the air conditioner includes, for instance, an instruction for changing the set temperature of the air conditioner, an instruction for turning on the air conditioner, or an instruction for turning off the air conditioner. Further, the instruction for operating the fan includes, for instance, an instruction for turning on the fan, or an instruction for turning off the fan.

Further, for instance, when baby's cry is detected for a predetermined time or longer, the information managing unit 16 may select an instruction for starting a baby toy, and the communication unit 15 may transmit the instruction for activating the baby toy to the baby toy disposed in the house where baby's cry is detected. The baby toy receives the instruction for activating the baby toy from the server 102, and the baby toy is activated in response to the received instruction.

Further, when baby's cry is detected for a predetermined time or longer, notice information for notifying that the baby is crying may be transmitted to a predetermined display terminal. For instance, when baby's cry is detected for a predetermined time or longer, the information managing unit 16 may select notice information for notifying that the baby is crying, and the communication unit 15 may transmit the notice information for notifying that the baby is crying to the television receiver 1. The communication unit 13 of the television receiver 1 receives the notice information for notifying that the baby is crying from the server 102, and the display unit 11 displays the received notice information for notifying that the baby is crying.

The communication unit 15 may transmit the notice information for notifying that the baby is crying to a mobile terminal of the parent of the baby. Examples of the mobile terminal include a smartphone, a tablet computer, and a mobile phone. Further, information for specifying the mobile terminal such as the mail address or the IP address is stored in the speaker database.

Figure 10:
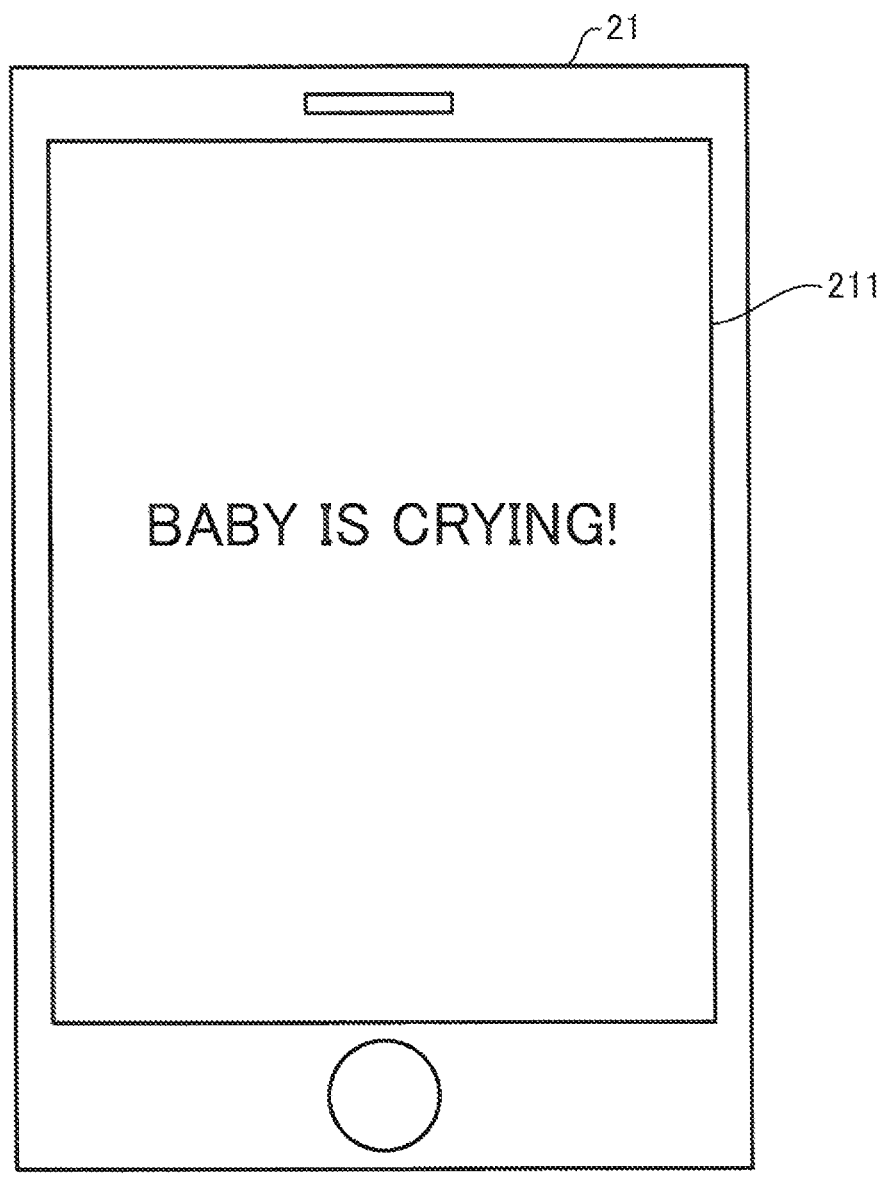
FIG. 10 is a diagram illustrating an example of a display screen to be displayed on a mobile terminal, when baby's cry is detected for a predetermined time or longer.

FIG. 10 is a diagram illustrating an example of a display screen to be displayed on a mobile terminal, when baby's cry is detected for a predetermined time or longer.

As illustrated in FIG. 10, when baby's cry is detected for a predetermined time or longer, "BABY IS CRYING!" is displayed on a display screen 211 of a mobile terminal 21 of the baby's parent. In this way, when baby's cry is detected for a predetermined time or longer, the fact that the baby is crying is notified to the mobile terminal 21 of the baby's parent. Thus, the baby's parent is allowed to know that the baby is crying.

Further, the server 102 may acquire the set temperature of an air conditioner installed in each of the houses, as log information, and may store the acquired log information in a database for each house. Further, the server 102 may store position information representing the address or the latitude and longitude of each house in a database. For instance, when baby's cry is detected for a predetermined time or longer, the information managing unit 16 acquires the set temperature of the air conditioner installed in the house where baby's cry is detected, and acquires the set temperature of an air conditioner installed in another house near the house where the baby's cry is detected, and in which a baby of the same month old as the crying baby resides. The information managing unit 16 compares the acquired two set temperatures, and when the two set temperatures differ from each other, the information managing unit 16 transmits information representing the acquired set temperature in the another house to the television receiver 1. The communication unit 13 of the television receiver 1 receives the information representing the set temperature in the another house from the server 102, and the display unit 11 displays the information representing the received set temperature in the another house.

For instance, when the set temperature of the air conditioner installed in a house where baby's cry is detected is 28° C., and the set temperature of the air conditioner installed in another house near the house where the baby's cry is detected and in which a baby of the same month old as the crying baby resides is 26° C., a message "the set temperature in the house nearby where a 3-month old baby resides is 26° C." is displayed on the display screen of the display unit 11.

When baby's cry is detected for a predetermined time or longer, the information managing unit 16 may acquire the set temperatures of the air conditioners installed in houses within a predetermined distance from a house where the baby's cry is detected, and in which babies of the same month old as the crying baby reside, may calculate an average temperature of the acquired set temperatures, and may transmit information representing the calculated average temperature to the television receiver 1.

Further, the server 102 may acquire, from the television receivers installed in the houses, information relating to the programs viewed by the users, as log information, and may store the acquired log information in a database for each house. Further, the server 102 may store the addresses or position information of the houses in a database. For instance, when baby's cry is detected for a predetermined time or longer, the information managing unit 16 acquires information relating to the programs viewed by the television receiver in a house near the house where the baby's cry is detected, and in which a baby of the same month old as the crying baby resides. The communication unit 15 transmits the acquired information relating to the programs to the television receiver 1. The communication unit 13 of the television receiver 1 receives the information relating to the programs viewed by the television receiver installed in the another house from the server 102, and the display unit 11 displays the received information relating to the programs viewed by the television receiver installed in the another house.

In this way, information relating to the programs viewed by the people in a house near the house where baby's cry is detected, and in which a baby of the same month old as the crying baby resides is notified. Displaying the programs in which the babies may be interested on a television receiver helps to calm or soothe the crying baby.

Further, the information managing unit 16 may count the number of times when baby's cry is detected for a predetermined time or longer, and may calculate the counted number of times as a stress degree of the baby's mother. The information managing unit 16 may calculate a stress degree every day as a graph. The communication unit 15 transmits the information relating to a stress degree in a graph to the television receiver 1. The communication unit 13 of the television receiver 1 receives the information relating to a stress degree in terms of a graph from the server 102, and the display unit 11 displays the received information relating to a stress degree in terms of a graph.

The communication unit 15 may transmit information relating to a stress degree in terms of a graph to the mobile terminal of the baby's father.

Each of the aforementioned examples describes a case in which baby's cry is detected for a predetermined time or longer. The invention is not specifically limited to the above. The same process as described above may be performed when baby's cry of a predetermined sound level or higher is detected.

Further, in the aforementioned example, a device is controlled when baby's cry is detected. A device may be controlled when not only cry of a baby but also cry of an infant is detected. It is desirable to store cry of infants in advance in the speaker database 4 or the like. This makes it possible to control the device (toy) or to output the contents to the display device according to the preference of a crying infant.

Further, in the embodiment, the information managing unit 16 may configure a database which accumulates only baby's cry in response to detection of baby's cry.

FIG. 11 is a diagram illustrating an example of a database which accumulates baby's cry. As illustrated in FIG. 11, the database stores user IDs, date and time information, sound pressure levels, and speech information in association with each other. The user ID is information for identifying the user. The date and time information is information representing a point of time when the speech information has been acquired. The sound pressure level is information representing the sound pressure level of the acquired speech information, and is measured when the speech information is acquired. The speech information is information in terms of spectra or frequencies of speech signals, and is stored as WAV format files. The speech information represents only baby's cry. The database may further store a period of time when baby's cry is detected.

The information managing unit 16 stores the speech information representing the detected baby's cry, and the point of time when the speech information has been detected in association with each other.

As described above, it is possible to grasp the health condition of a baby, based on log information on baby's cry.

Further, the speaker identification device 3 may detect a special speech of a speaker, for instance, coughs of a speaker; and the information managing unit 16 may accumulate the speech information representing the detected coughs, and the point of time when the speech information has been acquired in association with each other in a database.

As described above, according to the speaker identification system of the first embodiment, it is possible to grasp the accurate age, and to provide a service optimum for the age, without the need of performing an initial registration operation by the user.

Next, a speaker identification system as a first modification of the first embodiment of the invention is described.

Figure 12:
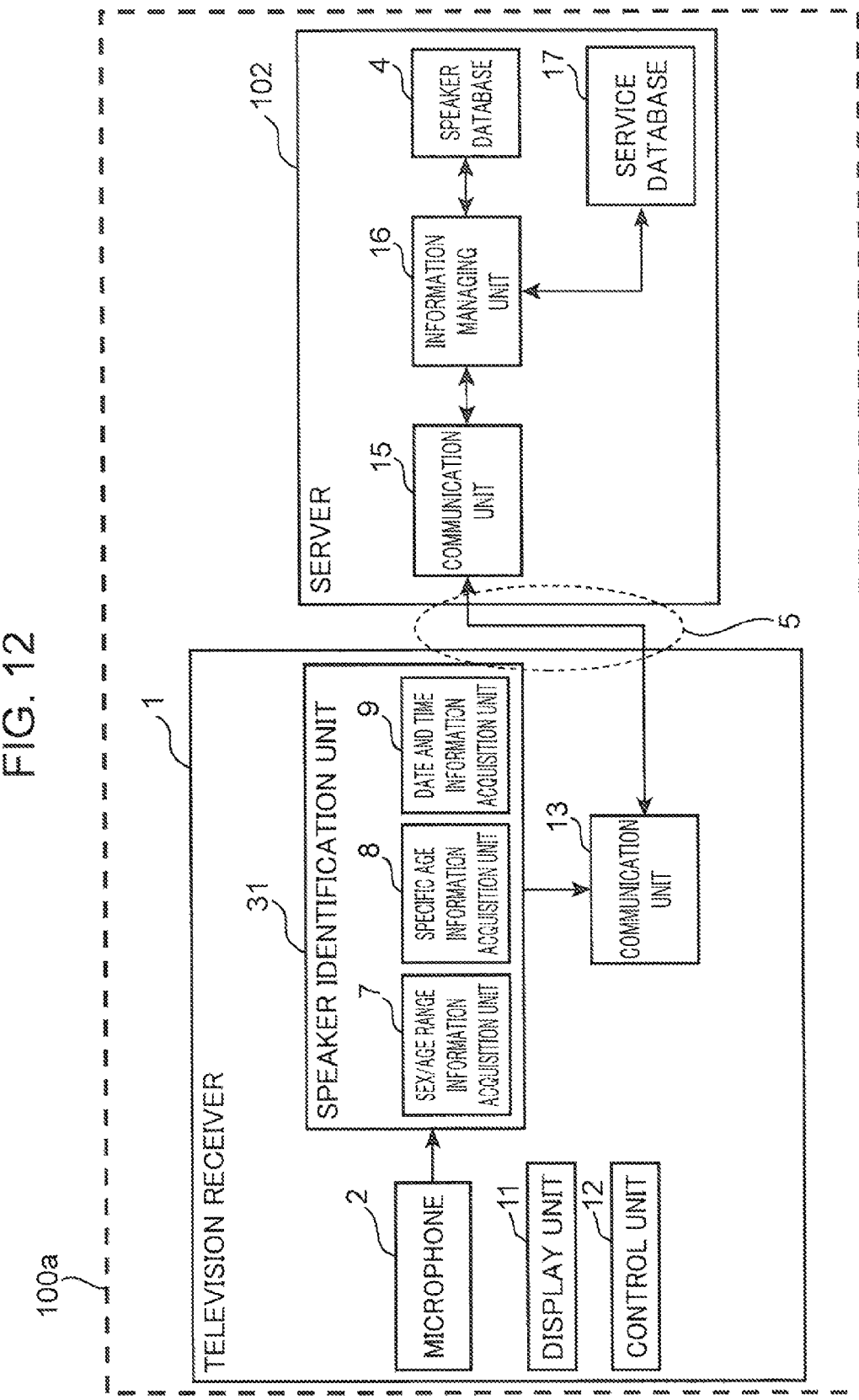
FIG. 12 is a block diagram illustrating a detailed configuration of a speaker identification system as a first modification of the first embodiment of the invention.

FIG. 12 is a block diagram illustrating a detailed configuration of the speaker identification system as the first modification of the first embodiment of the invention. The same constituent elements in the first modification as in the speaker identification system 100 illustrated in FIG. 2 are indicated with the same reference signs, and description thereof is omitted. The speaker identification system as the first modification is different from the speaker identification system 100 illustrated in FIG. 2 in a point that a television receiver 1 has the function of a microphone 2 and the function of a speaker identification device 3.

A speaker identification system 100a illustrated in FIG. 12 is provided with the television receiver 1 and a server 102.

The television receiver 1 is communicatively connected to the server 102 via a network 5. The television receiver 1 is provided with a display unit 11, a control unit 12, a communication unit 13, a microphone 2, and a speaker identification unit 31. The speaker identification unit 31 is provided with a sex/age range information acquisition unit 7, a specific age information acquisition unit 8, and a date and time information acquisition unit 9.

The communication unit 13 transmits and receives information to and from the server 102 via the network 5. The communication unit 13 transmits, to the server 102, speaker information, in which speech information acquired by the microphone 2, sex information acquired by the sex/age range information acquisition unit 7, age range information acquired by the sex/age range information acquisition unit 7, specific age information acquired by the specific age information acquisition unit 8, and date and time information acquired by the date and time information acquisition unit 9 are associated with each other.

The communication unit 15 transmits and receives information to and from the television receiver 1 via the network 5. The communication unit 15 receives the speaker information transmitted by the television receiver 1.

Next, an operation to be performed by the speaker identification system 100a as the first modification of the first embodiment of the invention is described.

Figure 13:
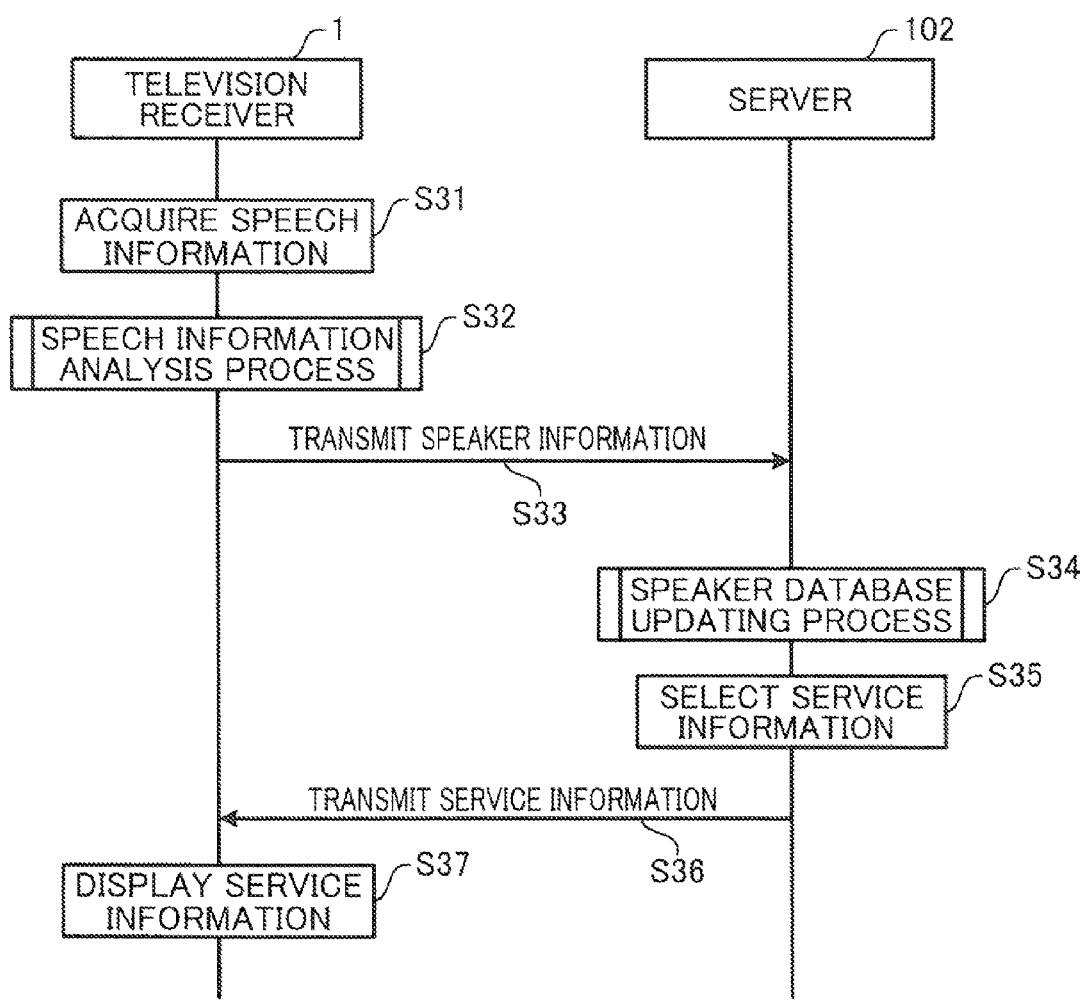
FIG. 13 is a sequence diagram illustrating a flow of a process to be performed by the speaker identification system as the first modification of the first embodiment of the invention.

FIG. 13 is a sequence diagram illustrating a flow of a process to be performed by the speaker identification system as the first modification of the first embodiment of the invention.

First of all, in Step S31, the microphone 2 of the television receiver 1 acquires speech information of the speaker. The microphone 2 outputs the acquired speech information to the speaker identification unit 31.

Subsequently, in Step S32, the speaker identification unit 31 of the television receiver 1 performs a speech information analysis process of analyzing the speech information acquired by the microphone 2. The speaker identification unit 31 creates speaker information by the speech information analysis process. The speech information analysis process is the same as described above using FIG. 9.

Subsequently, in Step S33, the communication unit 13 of the television receiver 1 transmits the speaker information created by the speaker identification unit 31 to the server 102. The communication unit 15 of the server 102 receives the speaker information transmitted by the television receiver 1.

The processes from Step S34 to Step S37 are the same as the processes from Step S5 to Step S8 illustrated in FIG. 4, and therefore, description thereof is omitted.

Next, a speaker identification system as a second modification of the first embodiment of the invention is described.

Figure 14:
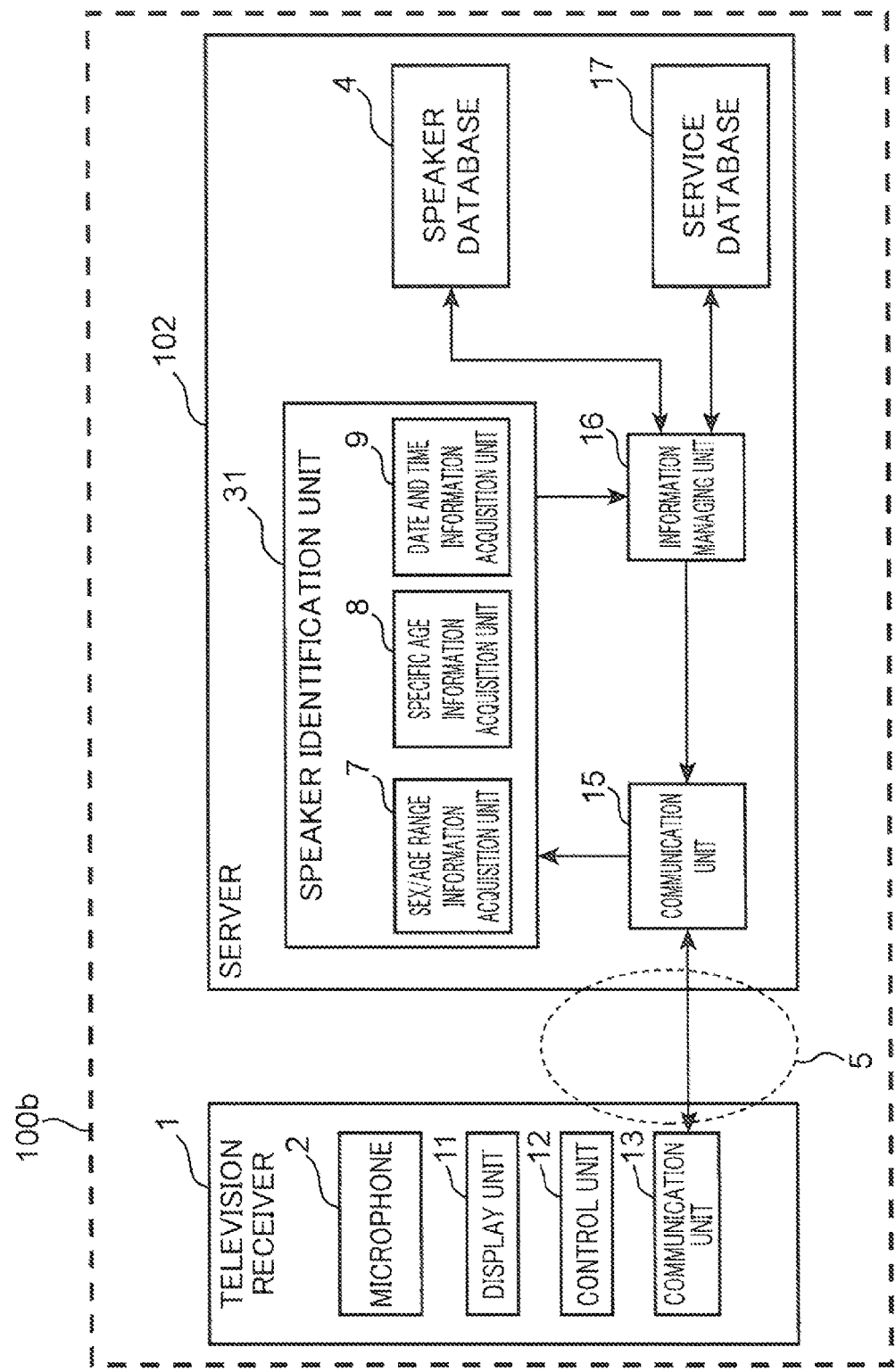
FIG. 14 is a block diagram illustrating a detailed configuration of a speaker identification system as a second modification of the first embodiment of the invention.

FIG. 14 is a block diagram illustrating a detailed configuration of the speaker identification system as the second modification of the first embodiment of the invention. The same constituent elements in the second modification as in the speaker identification system 100 illustrated in FIG. 2 are indicated with the same reference signs, and description thereof is omitted. The speaker identification system as the second modification is different from the speaker identification system 100 illustrated in FIG. 2 in a point that a television receiver 1 has the function of a microphone 2, and a server 102 has the function of a speaker identification device 3.

A speaker identification system 100b illustrated in FIG. 14 is provided with the television receiver 1 and the server 102.

The television receiver 1 is communicatively connected to the server 102 via a network 5. The television receiver 1 is provided with a display unit 11, a control unit 12, a communication unit 13, and the microphone 2.

The communication unit 13 transmits and receives information to and from the server 102 via the network 5. The communication unit 13 transmits speech information acquired by the microphone 2 to the server 102.

The server 102 is provided with a communication unit 15, an information managing unit 16, a speaker database 4, a service database 17, and a speaker identification unit 31.

The speaker identification unit 31 is provided with a sex/age range information acquisition unit 7, a specific age information acquisition unit 8, and a date and time information acquisition unit 9.

The communication unit 15 transmits and receives information to and from the television receiver 1 via the network 5. The communication unit 15 receives the speech information transmitted by the television receiver 1. The sex/age range information acquisition unit 7, the specific age information acquisition unit 8, and the date and time information acquisition unit 9 use the speech information received by the communication unit 15.

The speaker identification unit 31 is provided with the sex/age range information acquisition unit 7, the specific age information acquisition unit 8, and the date and time information acquisition unit 9. Speaker information, in which the speech information acquired by the microphone 2, the sex information acquired by the sex/age range information acquisition unit 7, the age range information acquired by the sex/age range information acquisition unit 7, the specific age information acquired by the specific age information acquisition unit 8, and the date and time information acquired by the date and time information acquisition unit 9 are associated with each other, is output to the information managing unit 16.

Next, an operation to be performed by the speaker identification system 100b as the second modification of the first embodiment of the invention is described.

Figure 15:
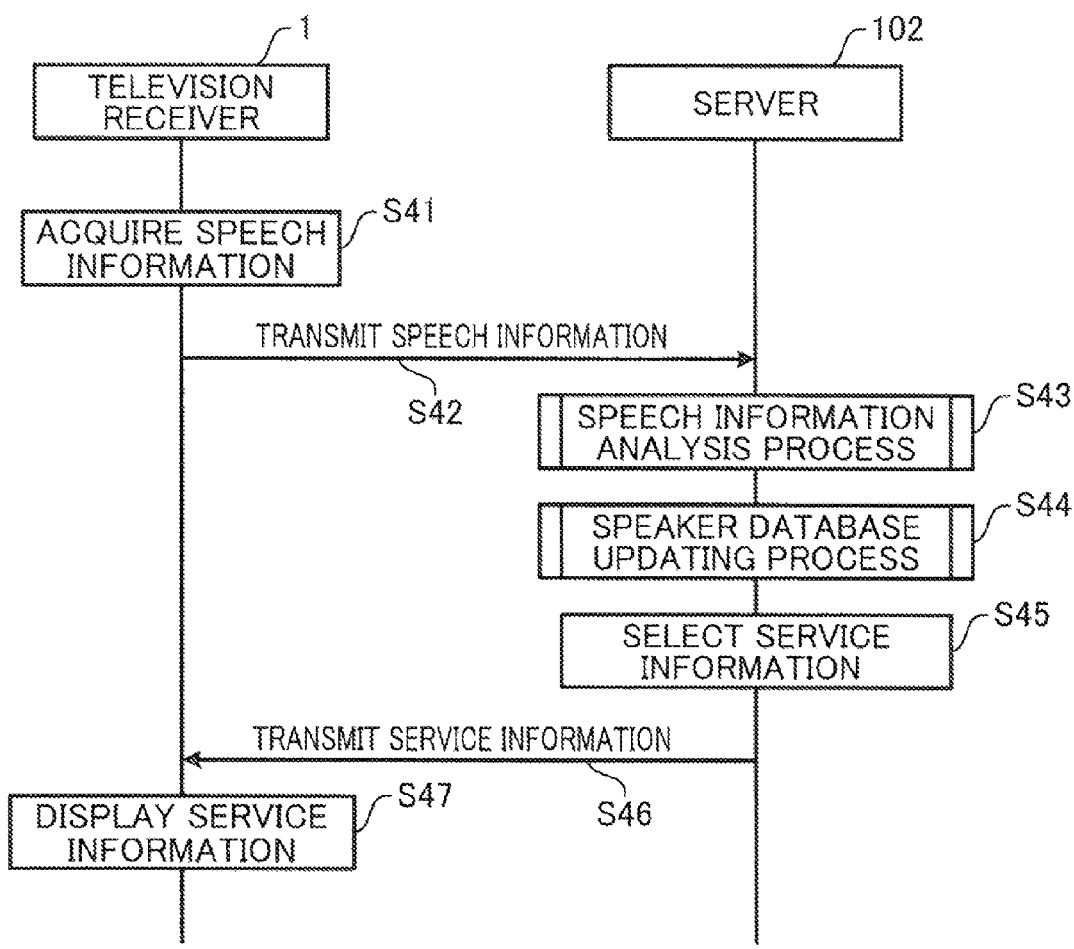
FIG. 15 is a sequence diagram illustrating a flow of a process to be performed by the speaker identification system as the second modification of the first embodiment of the invention.

FIG. 15 is a sequence diagram illustrating a flow of a process to be performed by the speaker identification system as the second modification of the first embodiment of the invention.

First of all, in Step S41, the microphone 2 of the television receiver 1 acquires speech information of the speaker.

Subsequently, in Step S42, the communication unit 13 of the television receiver 1 transmits the speech information acquired by the microphone 2 to the server 102. The communication unit 15 of the server 102 receives the speech information transmitted by the television receiver 1.

Subsequently, in Step S43, the speaker identification unit 31 of the television receiver 1 performs a speech information analysis process of analyzing the speech information received by the communication unit 15. The speaker identification unit 31 creates speaker information by the speech information analysis process. The speech information analysis process is the same as described above using FIG. 9.

The processes from Step S44 to Step S47 are the same as the processes from Step S5 to Step S8 illustrated in FIG. 4, and therefore, description thereof is omitted.

Next, a speaker identification system as a third modification of the first embodiment of the invention is described.

Figure 16:
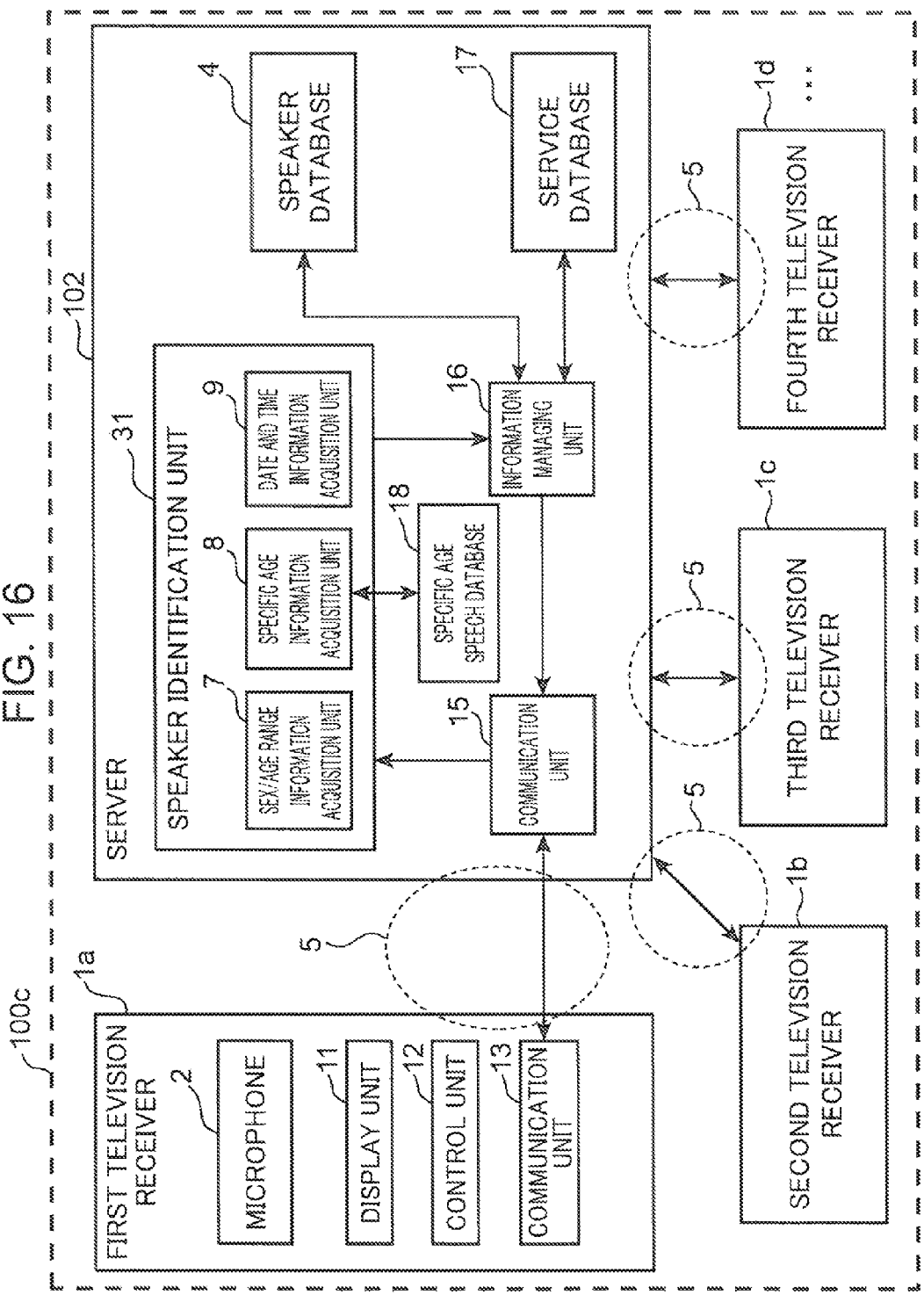
FIG. 16 is a block diagram illustrating a detailed configuration of a speaker identification system as a third modification of the first embodiment of the invention.

FIG. 16 is a block diagram illustrating a detailed configuration of the speaker identification system as the third modification of the first embodiment of the invention. The same constituent elements in the third modification as in the speaker identification system 100b illustrated in FIG. 14 are indicated with the same reference signs, and description thereof is omitted. The speaker identification system as the third modification is different from the speaker identification system 100b illustrated in FIG. 14 in a point that a speaker identification system 100c is provided with television receivers 1a to 1d, and a server 102 is provided with a specific age speech database 18 for storing speech information of speakers of specific ages.

The speaker identification system 100c illustrated in FIG. 16 is provided with the first television receiver 1a, the second television receiver 1b, the third television receiver 1c, the fourth television receiver 1d, and the server 102.

The first television receiver 1a, the second television receiver 1b, the third television receiver 1c, and the fourth television receiver 1d are disposed in individual houses. The first television receiver 1a is communicatively connected to the server 102 via a network 5. The first television receiver 1a is provided with a display unit 11, a control unit 12, a communication unit 13, and a microphone 2. The configurations of the second television receiver 1b, the third television receiver 1c, and the fourth television receiver 1d are the same as the configuration of the first television receiver 1a. In the third modification of the first embodiment, the speaker identification system 100c is provided with four television receivers. The invention is not specifically limited to the above. A speaker identification system may be provided with two television receivers, or three television receivers, or more than four television receivers.

The server 102 is provided with a communication unit 15, an information managing unit 16, a speaker database 4, a service database 17, a speaker identification unit 31, and the specific age speech database 18.

The specific age speech database 18 stores therein speech information of speakers of specific ages. The specific age information acquisition unit 8 stores, in the specific age speech database 18, the acquired specific age information, and the speech information acquired by the microphone 2 in association with each other. Further, the specific age information acquisition unit 8 may create an acoustic model for each specific age, with use of a plurality of speech information groups stored in the specific age speech database 18. The specific age information acquisition unit 8 may judge the specific age by comparing the speech information acquired by the microphone 2, and the created acoustic model.

When speaker information is newly stored in the speaker database 4, the information managing unit 16 may store the speaker information in the speaker database 4, in the case where the speaker information is detected for a predetermined period of time (e.g. for one week). According to this configuration, it is possible to avoid misunderstanding the speech of a visitor as speech of a family member.

Further, in the embodiment, a device provided with a microphone, in other words, a device for acquiring speech information is a television receiver; and a device provided with a display unit, in other words, a device for displaying information is a television receiver. The invention is not specifically limited to the above. Alternatively, a device for acquiring speech information may be a television receiver, and a device for displaying information may be a mobile terminal (e.g. a smartphone, a tablet computer, or a mobile phone). Further alternatively, a device for acquiring speech information may be a mobile terminal, and a device for displaying information may be a television receiver. Furthermore alternatively, a device for acquiring speech information may be a mobile terminal, and a device for displaying information may be a mobile terminal.

(Second Embodiment)

Figure 17:
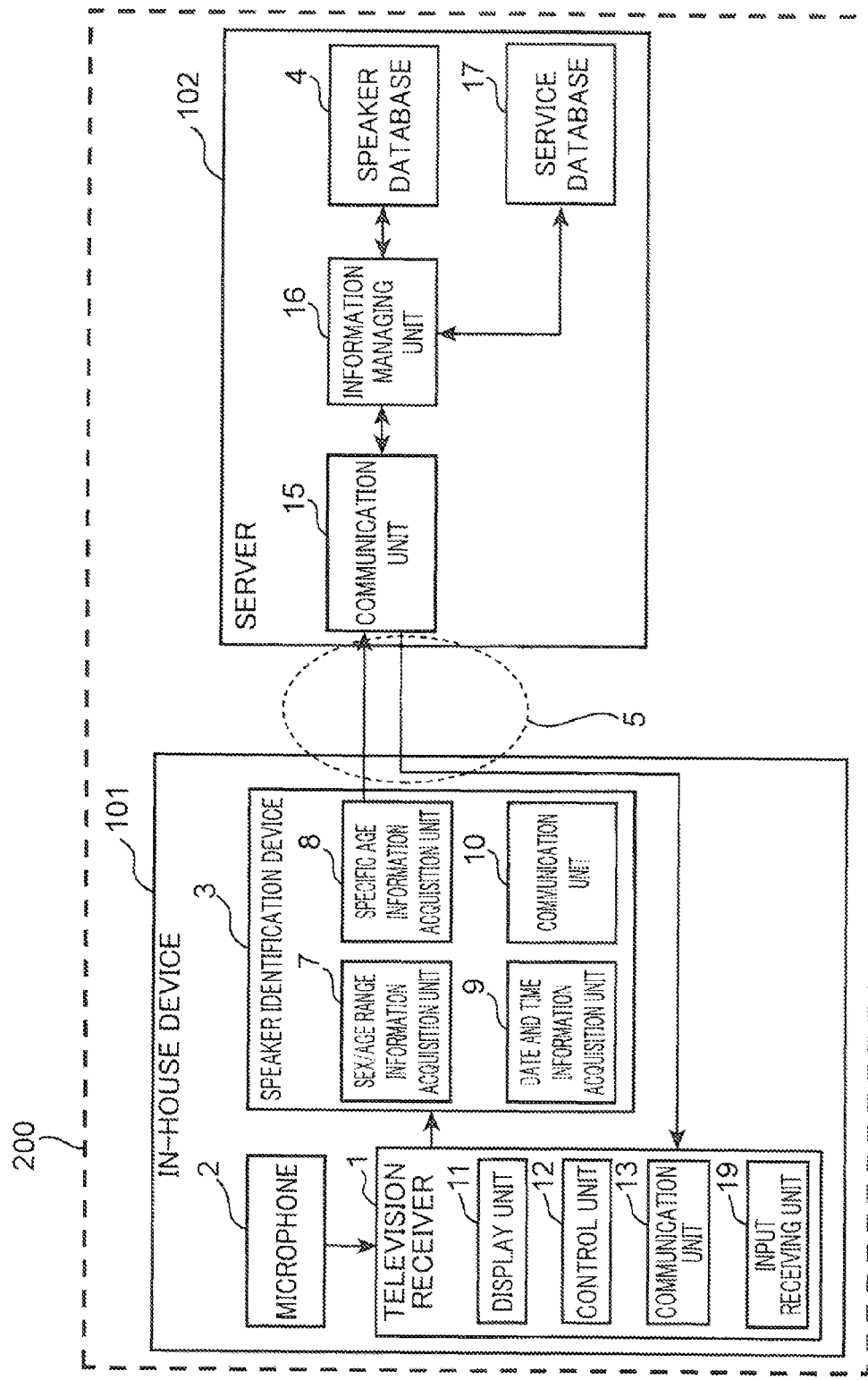
FIG. 17 is a block diagram illustrating a detailed configuration of a speaker identification system according to a second embodiment of the invention.

FIG. 17 is a block diagram illustrating a detailed configuration of a speaker identification system according to the second embodiment of the invention. The same constituent elements in the second embodiment as in the speaker identification system 100 illustrated in FIG. 2 are indicated with the same reference signs, and description thereof is omitted. The speaker identification system according to the second embodiment is different from the speaker identification system 100 illustrated in FIG. 2 in a point that a television receiver 1 is provided with an input receiving unit 19.

A speaker identification system 200 illustrated in FIG. 17 is provided with the television receiver 1, a microphone 2, a speaker identification device 3, and a server 102. The television receiver 1, the microphone 2, and the speaker identification device 3 are disposed in one house. An in-house device 101 is constituted of the television receiver 1, the microphone 2, and the speaker identification device 3.

The television receiver 1 is communicatively connected to the server 102 via a network 5. The television receiver 1 is provided with a display unit 11, a control unit 12, a communication unit 13, and the input receiving unit 19.

When the speaker of the speech information acquired by the microphone 2 is judged to be a zero-year-old baby by a specific age information acquisition unit 8, the control unit 12 controls the display unit 11 to display a user information input screen prompting the user to input user information.

When a user information input screen is displayed on the display unit 11, the input receiving unit 19 allows a user's input of information. The method for allowing a user's input by the input receiving unit 19 is not specifically limited. The input receiving unit 19 allows a user's input by e.g. a remote controller or an operation UI (User Interface) provided in the device main body.

Figure 18:
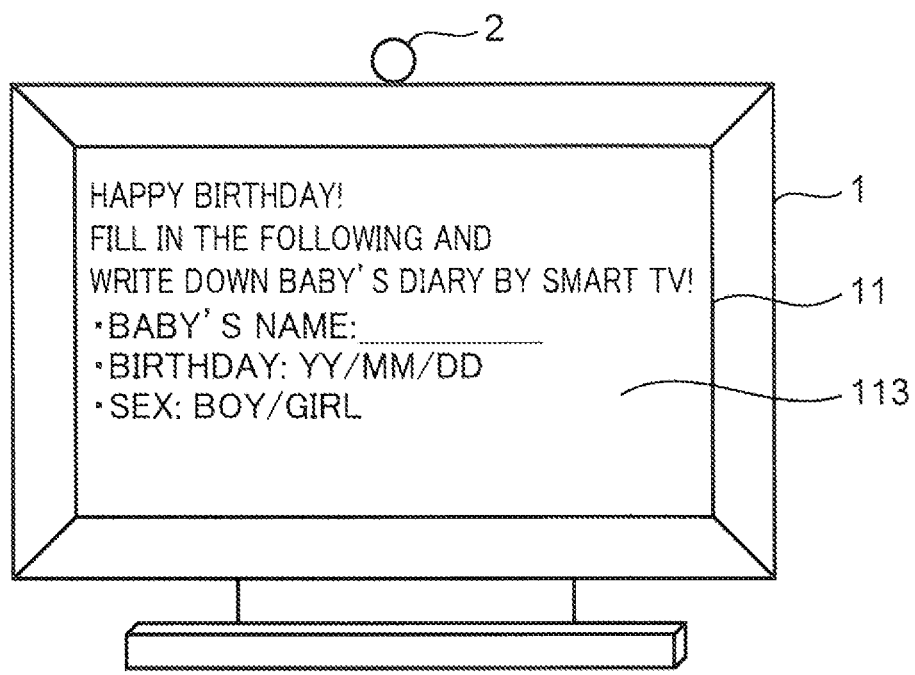
FIG. 18 is a diagram illustrating an example of a user information input screen prompting the user to input user information, when a specific age is detected by a specific age information acquisition unit.

FIG. 18 is a diagram illustrating an example of a user information input screen prompting the user to input user information, when a specific age is detected by the specific age information acquisition unit.

When the specific age information acquisition unit 8 judges that the speaker of the speech information acquired by the microphone 2 is a zero-year-old baby, the display unit 11 displays a user information input screen 113 prompting the user to input user information. An input of the name, the day of birth, and the sex of a newly detected speaker is allowed on the user information input screen 113.

The input receiving unit 19 allows a user's input with respect to the user information input screen 113. When an input of the name, the day of birth, and the sex of the speaker is allowed by the input receiving unit 19, the input data is transmitted to the server 102 together with the speech information, the sex information, the age range information, the specific age information, and the date and time information, and is stored in a speaker database 4.

When the specific age information acquisition unit 8 judges that the speaker of the speech information is a zero-year-old baby for a predetermined period of time or longer, the display unit 11 may display the user information input screen 113.

Further, when the specific age information acquisition unit 8 judges that the speaker of the speech information is a zero-year-old baby, the control unit 12 may judge whether the user who is judged to be the specific age by the specific age information acquisition unit 8 has already been registered in the speaker database 4. When the user who is judged to be the specific age by the specific age information acquisition unit 8 is not registered in the speaker database 4, the control unit 12 may control the display unit 11 to display the user information input screen 113.

Further, when a predetermined word is detected by the specific age information acquisition unit 8, the display unit 11 may display a user information input screen appropriate for the detected word.

Figure 19:
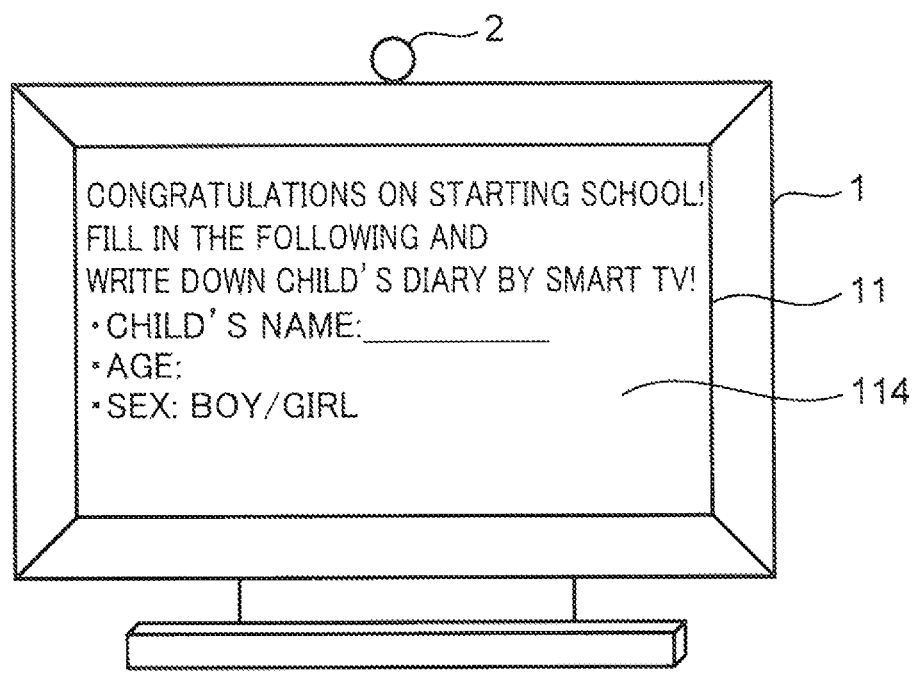
FIG. 19 is a diagram illustrating an example of a user information input screen prompting the user to input user information, when a predetermined word is detected by the specific age information acquisition unit.

FIG. 19 is a diagram illustrating an example of a user information input screen prompting the user to input user information, when a predetermined word is detected by the specific age information acquisition unit.

When the specific age information acquisition unit 8 detects a predetermined pre-registered word, as a result of analysis of the speech information acquired by the microphone 2, the control unit 12 controls the display unit 11 to display a user information input screen 114 prompting the user to input user information. Then, an input of the name, the age, and the sex of the speaker by whom the predetermined word is detected is allowed on the user information input screen 114.

For instance, the user information input screen 114 illustrated in FIG. 19 is a user information input screen to be displayed, when a pre-registered word "entrance ceremony" is detected by the specific age information acquisition unit 8. The television receiver 1 stores a user information input screen appropriate for a pre-registered word.

The input receiving unit 19 receives a user's input with respect to the user information input screen 114. When an input of the name, the age, and the sex of the speaker is allowed by the input receiving unit 19, the input data is transmitted to the server 102 together with the speech information, the sex information, the age range information, the specific age information, and the date and time information, and is stored in a speaker database 4.

When the specific age information acquisition unit 8 detects a predetermined word for a predetermined period of time or longer, the display unit 11 may display the user information input screen 113.

Further, in the second embodiment, the control unit 12 may control the display unit 11 to display the sex information, the age range information, and the specific age information acquired based on the speech information acquired by the microphone 2, and the input receiving unit 19 may receive user's correction with respect to the sex information, the age range information, and the specific age information. Specifically, when specific age information is acquired by the specific age information acquisition unit 8, the input receiving unit 19 may display the acquired specific age information, and may receive correction of the specific age information.

Further, in the speaker identification system 200 according to the second embodiment, it is possible to apply the configurations of the speaker identification systems 100a, 100b, and 100c as the first to third modifications of the first embodiment.

According to the speaker identification system 200 of the second embodiment, unlike the first embodiment, it is possible to know the accurate age by prompting the user to input information, while making it easy to input information.

INDUSTRIAL APPLICABILITY

The speaker identification method and the speaker identification system of the invention enable to know the accurate age of the speaker, and to provide services appropriate for the current age of the speaker. Thus, the speaker identification method and the speaker identification system of the invention are useful as a speaker identification method and a speaker identification system for identifying the speaker.

The invention claimed is:

1. A speaker identification method of identifying a speaker with a speaker identification system including a processor and a memory storing thereon a control program, said method comprising:
    a speech acquisition step of acquiring speech information of a speaker;
    an age information acquisition step of judging, with the speaker identification system including the processor, whether the age of the speaker is equal to a specific age, based on the speech information acquired in the speech acquisition step, and acquiring specific age information when it is judged that the age of the speaker is equal to the specific age;
    a date and time information acquisition step of acquiring date and time information representing a date and time when the speech information has been acquired in the speech acquisition step;
    an information accumulation step of accumulating the specific age information acquired in the age information acquisition step, and the date and time information acquired in the date and time information acquisition step in association with each other when the specific age information is acquired in the age information acquisition step; and
    an information managing step of updating the specific age information accumulated in the information accumulation step in accordance with the number of years elapsed from the date and time indicated by the date and time information accumulated in association with the specific age information.

2. The speaker identification method according to claim 1, wherein
    when the specific age information is not acquired in the age information acquisition step, the date and time information is not acquired.

3. The speaker identification method according to claim 1, wherein
   in the age information acquisition step, it is judged whether the age of the speaker is equal to the specific age, with use of at least one of an average frequency, a sound pressure level, and information relating to an uttered word of the speech information.

4. The speaker identification method according to claim 1, further comprising:
   a word detection step of analyzing the speech information acquired in the speech acquisition step for converting into character data, and detecting a predetermined pre-registered word from among the converted character data, wherein
   in the age information acquisition step, age range information relating to a range of the age of the speaker, which is estimated based on the speech information acquired in the speech acquisition step, is acquired to judge whether the age of the speaker is equal to the specific age, based on the age range information and the predetermined word detected in the word detection step.

5. The speaker identification method according to claim 1, wherein
   in the age information acquisition step, age range information relating to a range of the age of the speaker, which is estimated based on the speech information acquired in the speech acquisition step, is further acquired, and
   in the information accumulation step, the speech information acquired in the speech acquisition step, and the age range information acquired in the age information acquisition step are further accumulated in association with each other.

6. The speaker identification method according to claim 5, wherein
   in the age information acquisition step, sex information relating to the sex of the speaker, which is estimated based on the speech information acquired in the speech acquisition step, is further acquired, and
   in the information accumulation step, the sex information acquired in the age information acquisition step is further accumulated in association with the speech information, the age range information, and the specific age information.

7. The speaker identification method according to claim 1, wherein
   in the age information acquisition step, when a fundamental frequency of the speech information changes by a predetermined threshold value or more at a predetermined measurement time interval, it is judged that the specific age information represents a zero-year-old, and the specific age information is acquired.

8. The speaker identification method according to claim 1, wherein
   in the age information acquisition step, a database relating to speech information of family members for speech information acquisition is configured by continuously acquiring the speech information, and
   when speech information that does not constitute the database is acquired, it is judged that the specific age information represents a zero-year-old with respect to the speech information, and the specific age information is acquired.

9. The speaker identification method according to claim 6, further comprising:
   an estimation step of estimating relationships between speakers respectively having different speech information acquired in the speech information acquisition step, based on the sex information, the age range information, and the specific age information.

10. The speaker identification method according to claim 9, wherein
    in the estimation step, a relationship between a speaker having first speech information, and a speaker having second speech information is estimated, based on a specific age represented by the first speech information of the speaker whose age is judged to be equal to the specific age
    in the age information acquisition step, and based on the sex information and the age range information of the second speech information of the speaker whose age is judged not to be equal to the specific age in the age information acquisition step.

11. The speaker identification method according to claim 6, further comprising:
    a service providing step of providing a service to the speaker, based on the sex information, the age range information, and the specific age information accumulated in the information accumulation step.

12. The speaker identification method according to claim 11, wherein
    in the service providing step, advertisement information appropriate for the age to be specified by the specific age information is transmitted, the specific age information being accumulated in the information accumulation step and updated in the information managing step.

13. The speaker identification method according to claim 1, further comprising:
    a word detection step of analyzing the speech information acquired in the speech acquisition step for converting into character data, and detecting a predetermined pre-registered word from among the converted character data; and
    a service providing step of providing a service appropriate for the detected predetermined word.

14. The speaker identification method according to claim 1, further comprising:
    an utterance detection step of detecting a specific utterance of a specific speaker, based on the speech information acquired in the speech acquisition step; and
    a service providing step of providing a service appropriate for the specific utterance of the specific speaker.

15. The speaker identification method according to claim 14, wherein
    in the utterance detection step, cry of the specific speaker is detected, based on the speech information acquired in the speech acquisition step, and
    in the service providing step, a predetermined instrument is operated, when the cry of the specific speaker is detected for a predetermined time or longer.

16. The speaker identification method according to claim 14, wherein
    in the utterance detection step, cry of the specific speaker is detected, based on the speech information acquired in the speech acquisition step, and
    in the service providing step, notice information for notifying that the specific speaker is crying is transmitted to a predetermined display terminal, when the cry of the specific speaker is detected for a predetermined time or longer.

17. The speaker identification method according to claim 14, wherein
    in the utterance detection step, cry of the specific speaker is detected, based on the speech information acquired in the speech acquisition step, and the speaker identification method further comprising a cry information accumulation step of accumulating speech information representing the detected cry, and a point of time when the speech information has been acquired in association with each other.

18. The speaker identification method according to claim 1, further comprising:
a correction receiving step of displaying the acquired specific age information, and allowing a user to correct the specific age information, when the specific age information is acquired in the age information acquisition step.

19. A speaker identification system, comprising:
a processor and a memory storing thereon a control program which when executed by the processor causes the speaker identification system to function as:
a speech acquisition unit which acquires speech information of a speaker;
an age information acquisition unit which judges whether the age of the speaker is equal to a specific age, based on the speech information acquired by the speech acquisition unit, and acquires specific age information when it is judged that the age of the speaker is equal to the specific age;
a date and time information acquisition unit which acquires date and time information representing a date and time when the speech information has been acquired by the speech acquisition unit;
an information accumulation unit which accumulates the specific age information acquired by the age information acquisition unit, and the date and time information acquired by the date and time information acquisition unit in association with each other when the specific age information is acquired by the age information acquisition unit and
an information managing unit which updates the specific age information accumulated in the information accumulation unit in accordance with the number of years elapsed from the date and time indicated by the date and time information accumulated in association with the specific age information.

\* \* \* \* \*